(12) United States Patent
Du

(10) Patent No.: US 11,926,383 B2
(45) Date of Patent: Mar. 12, 2024

(54) SYSTEMS AND METHODS FOR CONTROLLING AN OBJECT

(71) Applicant: BEIJING QISHENG SCIENCE AND TECHNOLOGY CO., LTD., Beijing (CN)

(72) Inventor: Muguo Du, Beijing (CN)

(73) Assignee: BEIJING QISHENG SCIENCE AND TECHNOLOGY CO., LTD., Beijing (CN)

( * ) Notice: Subject to any disclaimer, the term of this patent is extended or adjusted under 35 U.S.C. 154(b) by 813 days.

(21) Appl. No.: 17/021,010

(22) Filed: Sep. 15, 2020

(65) Prior Publication Data
US 2021/0031848 A1 Feb. 4, 2021

Related U.S. Application Data

(63) Continuation of application No. PCT/CN2018/123614, filed on Dec. 25, 2018.

(30) Foreign Application Priority Data

Mar. 15, 2018 (CN) .......................... 201810215970.1

(51) Int. Cl.
*G06F 17/00* (2019.01)
*B60R 25/32* (2013.01)
(Continued)

(52) U.S. Cl.
CPC ............... *B62H 5/00* (2013.01); *B60R 25/32* (2013.01); *B62H 5/001* (2013.01); *B62H 5/08* (2013.01);
(Continued)

(58) Field of Classification Search
CPC .. B62H 5/00; B62H 5/001; B62H 5/08; B60R 25/32; B62J 7/00; B62J 45/20;
(Continued)

(56) References Cited

U.S. PATENT DOCUMENTS 9,820,120 B2 * 11/2017 deCharms ............... H04W 4/02
10,069,703 B2 * 9/2018 Jung .................... H04L 63/0421
(Continued)

FOREIGN PATENT DOCUMENTS

CN 101865081 A 10/2010
CN 102060020 A 5/2011
(Continued)

OTHER PUBLICATIONS

Bicycle Sharing System—Identical Solution for Your Business (Year: 2023).*
(Continued)

*Primary Examiner* — Ronnie M Mancho
(74) *Attorney, Agent, or Firm* — METIS IP LLC

(57) ABSTRACT

A system and a method for controlling a bicycle used in an online to offline (O2O) service platform that provides a sharing service of bicycles are provided. The system may detect a pressure signal from at least one part of the bicycle. The system may determine an access permission level based at least on the pressure signal. The system may further control at least one electric control component of the bicycle according to at least the user permission level.

18 Claims, 12 Drawing Sheets

(51) Int. Cl.
  *B62H 5/00* (2006.01)
  *B62H 5/08* (2006.01)
  *B62J 7/00* (2006.01)
  *B62J 45/20* (2020.01)
  *B62J 45/412* (2020.01)
  *B62L 3/06* (2006.01)
  *B62M 3/08* (2006.01)
  *B62M 6/45* (2010.01)

(52) U.S. Cl.
  CPC .............. *B62J 7/00* (2013.01); *B62J 45/20* (2020.02); *B62J 45/412* (2020.02); *B62L 3/06* (2013.01); *B62M 3/08* (2013.01); *B62M 6/45* (2013.01)

(58) Field of Classification Search
  CPC .......... B62J 45/412; B62L 3/06; B62M 3/08; B62M 6/45; G06Q 20/145; G06Q 30/0645; G06Q 20/0855; G06Q 20/3224; G06Q 20/4015; G06Q 50/30; G05B 19/042; G05B 19/0428; G05B 2219/24167; G07F 17/0057
  USPC .......................................................... 701/22
  See application file for complete search history.

(56) References Cited

U.S. PATENT DOCUMENTS

| | | | |
|---|---|---|---|
| 10,142,276 B2* | 11/2018 | Rapaport | H04N 21/8358 |
| 10,255,740 B2* | 4/2019 | Duan | H04L 63/083 |
| 10,412,210 B2* | 9/2019 | Bjontegard | A63F 13/32 |
| 10,991,242 B2* | 4/2021 | Taylor | H04Q 9/00 |
| 11,615,710 B2* | 3/2023 | Seagraves | H04W 4/029 705/13 |
| 2010/0228405 A1 | 9/2010 | Morgal et al. | |
| 2010/0292840 A1 | 11/2010 | Ruan et al. | |
| 2012/0234777 A1 | 9/2012 | Chen | |
| 2015/0091698 A1 | 4/2015 | Du | |
| 2015/0165835 A1 | 6/2015 | Peine | |
| 2015/0367789 A1 | 12/2015 | Drake et al. | |
| 2016/0192166 A1* | 6/2016 | deCharms | H04N 7/148 348/14.02 |
| 2016/0221627 A1* | 8/2016 | Hines | B62J 6/056 |
| 2017/0057595 A1 | 3/2017 | Peng | |
| 2017/0337813 A1* | 11/2017 | Taylor | G05D 1/0285 |
| 2018/0127040 A1 | 5/2018 | Mathissen | |
| 2018/0182196 A1* | 6/2018 | Duan | G07C 9/00309 |
| 2018/0194421 A1* | 7/2018 | Hines | B62H 5/20 |
| 2019/0127010 A1 | 5/2019 | Jiang et al. | |
| 2021/0005089 A1* | 1/2021 | Seagraves | G06Q 10/06311 |

FOREIGN PATENT DOCUMENTS

| | | |
|---|---|---|
| CN | 202243032 U | 5/2012 |
| CN | 103057655 A | 4/2013 |
| CN | 204527506 U | 8/2015 |
| CN | 204734940 U | 11/2015 |
| CN | 205034218 U | 2/2016 |
| CN | 106114723 A | 11/2016 |
| CN | 106143773 A | 11/2016 |
| CN | 106184540 A | 12/2016 |
| CN | 106218761 A | 12/2016 |
| CN | 106226551 A | 12/2016 |
| CN | 106226553 A | 12/2016 |
| CN | 106875533 A | 6/2017 |
| CN | 106918385 A | 7/2017 |
| CN | 107172392 A | 9/2017 |
| CN | 107314803 A | 11/2017 |
| CN | 107424267 A | 12/2017 |
| CN | 107490489 A | 12/2017 |
| CN | 107633585 A | 1/2018 |
| CN | 107680282 A | 2/2018 |
| CN | 207000662 U | 2/2018 |
| CN | 107798581 A | 3/2018 |
| DE | 102010026767 A1 | 4/2011 |
| JP | 2010110038 A | 5/2010 |

OTHER PUBLICATIONS

Bicycle Sharing System—Identical Solution for Your Business (Year: 2023) (Year: 2023).*
The Extended European Search Report in European Application No. 18909880.9 dated Mar. 4, 2021, 11 pages.
First Office Action in Chinese Application No. 202110837512.3 dated May 25, 2022, 21 pages.
International Search Report in PCT/CN2018/123614 dated Mar. 26, 2019, 4 pages.
Written Opinion in PCT/CN2018/123614 dated Mar. 26, 2019, 4 pages.
First Office Action in Chinese Application No. 201810215970.1 dated Apr. 20, 2020, 22 pages.

* cited by examiner

SYSTEMS AND METHODS FOR CONTROLLING AN OBJECT

CROSS-REFERENCE TO RELATED APPLICATIONS

This application is a continuation of International Application No. PCT/CN2018/123614 filed on Dec. 25, 2018, which claims priority of Chinese Patent Application No. 201810215970.1, filed on Mar. 15, 2018, the entire contents of which are hereby incorporated by reference.

TECHNICAL FIELD

The present disclosure relates to controlling an object, and in particular, to systems and methods for controlling a bicycle.

BACKGROUND

With the development of the Internet or Internet of Things (IoT) technologies, online to offline (O2O) services (e.g., bicycle sharing services) have become more and more popular. Through an online service platform, a user can request an online to offline service by an application installed in his/her mobile device (e.g., a smart phone). Taking the bicycle sharing service as an example, after receiving a service request from the user terminal (e.g., an application installed in the user terminal), the online service platform may identify user authorization using the shared bicycle. If the user authorization is valid, the service platform may allocate a target bicycle corresponding to the service request to the service requester. However, in some cases, some service requesters (e.g., the requesters who are too light, too heavy or too young) may not be suitable to use the shared bicycle or some functions of the shared bicycle, which may cause injury issues and other issues, and render bad users' experience. Therefore, it is desirable to develop systems and methods for controlling the shared bicycle for improving the safety of the service requester who uses the shared bicycles.

SUMMARY

According to one aspect of the present disclosure, a method is provided. The method may include one or more of the following operations. At least one processor may detect a pressure signal from at least one part of the bicycle. The at least one processor may determine an access permission level based at least on the pressure signal, and control at least one electric control component of the bicycle according to at least the user permission level.

In some embodiments, the access permission level may include no use of the bicycle, limited use of the bicycle, full use of the bicycle or terminated use.

In some embodiments, the bicycle may include a seat, a pedal, or a basket.

In some embodiments, the at least one electric control component may include a lock, a braking device, or an electric motor.

In some embodiments, the at least one processor may obtain user information of a service requester. The at least one processor may determine whether the user information is legitimate, and unlock the bicycle in response that the user information is legitimate.

In some embodiments, the at least one processor may determine whether the pressure signal is greater than or equal to a first pressure threshold. The at least one processor may determine the access permission level to be full use of the bicycle in response to a determination that the pressure signal is greater than or equal to the first pressure threshold. The at least one processor may turn on the electric motor of the bicycle according to the access permission level of full use of the bicycle.

In some embodiments, the at least one processor may determine whether the pressure signal is greater than or equal to a first pressure threshold and less than or equal to a third pressure threshold, wherein the third pressure signal is greater than the first pressure signal. The at least one processor may determine the access permission level to be full use of the bicycle in response to a determination that the pressure signal is greater than or equal to the first pressure threshold and less than or equal to the third pressure threshold. The at least one processor may turn on the electric motor of the bicycle according to the access permission level of full use of the bicycle.

In some embodiments, the at least one processor may obtain a speed signal of the bicycle. The at least one processor may determine whether the speed signal is greater than a first speed threshold. In response to a determination that the speed signal is greater than the first speed threshold, the at least one processor may determine whether the pressure signal is greater than or equal to a first pressure threshold and less than or equal to a third pressure threshold, wherein the third pressure signal is greater than the first pressure signal. The at least one processor may determine the access permission level to be full use of the bicycle in response to a determination that the pressure signal is greater than or equal to the first pressure threshold and less than or equal to the third pressure threshold. The at least one processor may maintain operation of the electric motor of the bicycle according to the access permission level of full use of the bicycle.

In some embodiments, the at least one processor may obtain a speed signal of the bicycle. The at least one processor may determine whether the speed signal is greater than a first speed threshold. In response to a determination that the speed signal is greater than the first speed threshold, the at least one processor may determine whether the pressure signal is greater than or equal to a first pressure threshold and less than or equal to a third pressure threshold, wherein the third pressure signal is greater than the first pressure signal. The at least one processor may determine the access permission level to be no use of the bicycle in response to a determination that the pressure signal is less than the first pressure threshold or greater than the third pressure threshold. The at least one processor may turn off the electric motor of the bicycle according to the access permission level of no use of the bicycle.

In some embodiments, the at least one processor may obtain a speed signal of the bicycle. The at least one processor may determine whether the speed signal is greater than a first speed threshold. In response to a determination that the speed signal is greater than the first speed threshold, the at least one processor may determine whether the pressure signal is less than a first pressure threshold or greater than a third pressure threshold, wherein the third pressure signal is greater than the first pressure signal. The at least one processor may determine the access permission level to be limited use of the bicycle in response to a determination that the pressure signal is less than the first pressure threshold or greater than the third pressure threshold. The at least one processor may control the electric motor of the bicycle according to the access permission level of limited use of the bicycle and limit a speed of the bicycle to be less than a second speed threshold, wherein the second speed threshold is less than the first speed threshold.

In some embodiments, the at least one processor may obtain a speed signal of the bicycle. The at least one processor may determine whether the speed signal is greater than a first speed threshold. In response to a determination that the speed signal is greater than the first speed threshold, the at least one processor may determine whether the pressure signal is less than a first pressure threshold or greater than a third pressure threshold, wherein the third pressure signal is greater than the first pressure signal. The at least one processor may determine the access permission level to be limited use of the bicycle in response to a determination that the pressure signal is less than the first pressure threshold or greater than the third pressure threshold. The at least one processor may control the braking device of the bicycle according to the access permission level of limited use of the bicycle and limit a speed of the bicycle to be less than a second speed threshold, wherein the second speed threshold is less than the first speed threshold.

In some embodiments, the at least one processor may determine whether the pressure signal is less than a second pressure threshold. The at least one processor may determine the access permission level to be terminated use of the bicycle in response to a determination that the pressure signal is less than the second pressure threshold, and turn off the electric motor of the bicycle and lock the lock of the bicycle according to the access permission level of terminated use of the bicycle.

In some embodiments, the at least one processor may obtain location information of the bicycle, and determine whether the bicycle is returned successfully based on the location.

In some embodiments, the at least one processor may determine whether the bicycle is at a first location based on the obtained location information, and determine that, in response to a determination that the obtained location is at the first location, the electric bicycle is returned successfully. Otherwise, the bicycle is not returned.

In some embodiments, the at least one processor may receive a signal indicating that the bicycle is returned successfully.

In some embodiments, the at least one processor may obtain a speed signal of the bicycle. The at least one processor may determine whether the speed signal is greater than a first speed threshold. In response to a determination that the speed signal is greater than the first speed threshold, the at least one processor may determine whether the pressure signal is greater than a fourth pressure threshold. The at least one processor may determine the access permission level to be limited use of the bicycle in response to a determination that the pressure signal is greater than the fourth pressure threshold. The at least one processor may control the braking device of the bicycle according to the access permission level of limited use of the bicycle and limit a speed of the bicycle to be less than a second speed threshold, wherein the second speed threshold is less than the first speed threshold.

According to another aspect of the present disclosure, a system is provided. The system may include at least one storage device, at least one processor in communication with the at least one storage device. The at least one storage device may include one or more sets of instructions. When executing the one or more sets of instructions, the at least one processor may detect a pressure signal from at least one part of the bicycle. The at least one processor may determine an access permission level based at least on the pressure signal, and control at least one electric control component of the bicycle according to at least the user permission level.

According to another aspect of the present disclosure, a non-transitory computer readable medium is provided. The non-transitory computer readable medium may comprise executable instructions that cause at least one processor to effectuate a method. The method may include one or more of the following operations. At least one processor may detect a pressure signal from at least one part of the bicycle. The at least one processor may determine an access permission level based at least on the pressure signal, and control at least one electric control component of the bicycle according to at least the user permission level.

According to another aspect of the present disclosure, an apparatus is provided. The apparatus may include at least one device including one or more sets of instructions, and at least one processor in communication with the at least one storage device. When executing the one or more sets of instructions, the at least one processor is configured to cause the apparatus to perform the method disclosed in the present disclosure, for example, the method for controlling a bicycle used in an online to offline (O2O) service platform that provides a sharing service of bicycles.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
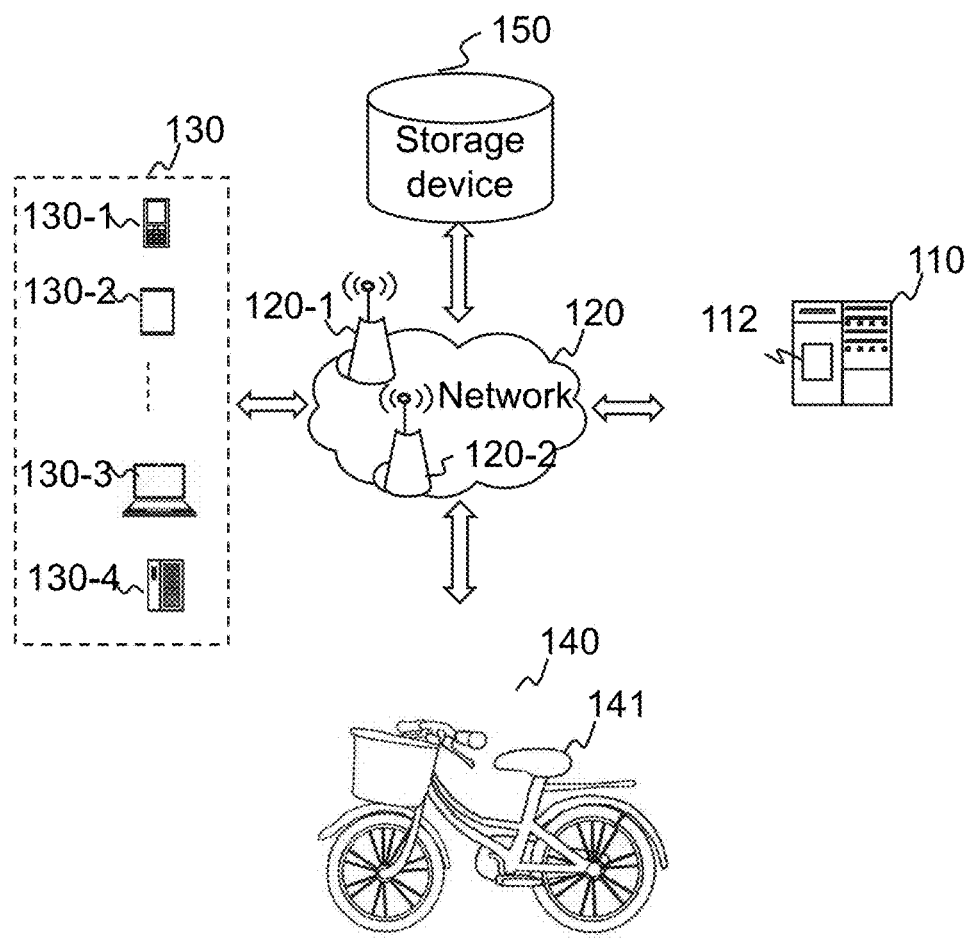
FIG. 1 is a schematic diagram illustrating an exemplary online to offline (O2O) service system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure. However, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flowcharts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Moreover, while the system and method in the present disclosure is described primarily in regard to controlling an object (e.g., an electric bicycle or a human-powered bicycle) providing a transportation service (e.g., a shared transportation service), it should also be understood that the present disclosure is not intended to be limiting. The system or method of the present disclosure may be applied to any other kind of online to offline (O2O) service. For example, the systems or methods of the present disclosure may be applied to transportation systems of different environments including land, ocean, aerospace, or the like, or any combination thereof. The object of the transportation systems may include a bicycle, a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for transmitting and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof. It should be understood that application scenarios of the system and method disclosed herein are only some examples or embodiments. Those having ordinary skills in the art, without further creative efforts, other application scenarios are applied under the teaching of these drawings. For example, an online service platform that provides a shared use of a vehicle.

The term "passenger," "requester," "service requester," and "customer" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," "requests," and "order" in the present disclosure are used interchangeably to refer to a request that may be initiated by a passenger, a service requester, a customer, a driver, a provider, a service provider, or the like, or any combination thereof. The service request may be accepted by any one of a passenger, a service requester, a customer, a driver, a provider, or a service provider. The service request may be chargeable or free.

The term "service provider terminal" and "driver terminal" in the present disclosure are used interchangeably to refer to a mobile terminal that is used by a service provider to provide a service or facilitate the providing of the service. The term "service requester terminal" and "passenger terminal" in the present disclosure are used interchangeably to refer to a mobile terminal that is used by a service requester to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

In an aspect, the present disclosure is directed to systems and methods for controlling an object in connection with an online to offline (O2O) service platform that provides a shared use of the object. The object may be designated as a service provider. In particular, the object may include a bicycle (e.g., an electric bicycle or a human-powered bicycle). In some embodiments, the systems and methods of the present disclosure may be used to control the bicycle based on one or more access permission levels. The access permission level may indicate functions or features of the bicycle that a service requester is available to use. In some embodiments, the access permission level may be determined based at least on a pressure signal loaded on at least one part of the bicycle. The descriptions below use the bicycle as an example. It should be noted, however, that other types of objects (e.g., service providers) may also be controlled with the systems and methods herein disclosure— for example, a vehicle, an electric motor cycle, a scooter, a hoverboard.

FIG. 1 is a schematic diagram illustrating an exemplary online to offline (O2O) service system according to some embodiments of the present disclosure. The O2O service system 100 may be a platform for data and/or information processing, for example, processing an order request from a service requester. In some embodiments, the O2O service system 100 may include a system (e.g., a bicycle service system) for processing the order request and control an object (e.g., a bicycle) for providing the service order. In some embodiments, the service may be a transportation service, such as a bicycle sharing service. Merely for illustration, the O2O service system 100 may be configured to provide the shared use of the bicycle. As used herein, the O2O service system 100 may be designated as the bicycle service system 100. The bicycle service system 100 may include a bicycle control device 110, a requester terminal 130, a storage device 150, a service provider 140, and a network 120.

In some embodiments, the bicycle control device 110 may be configured in a system that analyzes collected information to generate an analysis result. In some embodiments, the bicycle control device 110 may be a single server or a server group. The server group may be centralized, e.g., a data center. The server group may be distributed, e.g., a distributed system. In some embodiments, the bicycle control device 110 may be local or remote. In some embodiments, the bicycle control device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the bicycle control device 110 may be implemented on a computing device 200 having one or more components illustrated in FIG. 2 in the present disclosure.

In some embodiments, the bicycle control device 110 may include a processing engine 112 for executing instructions (or program codes) of the bicycle control device 110. For example, the processing engine 112 may execute one or more instructions that control an electric bicycle, in order to control at least one electric control component of the electric bicycle based on access permission level regarding the electric bicycle according to a specific algorithm.

In some embodiments, the processing engine 112 may include one or more processors (e.g., single-core processor(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, a service requester may be a user of the requester terminal 130. The service requester refers to an individual, a tool, or other entity that places a service order. The requester terminal 130 may include but not limited to a mobile device 130-1, a tablet computer 130-2, a laptop computer 130-3, a built-in device in a motor vehicle 130-4, or the like, or any combination thereof.

In some embodiments, the service provider 140 refers to a device, a tool or other entity that executes the service order. For example, the service provider 140 may include a bicycle. The bicycle may be a human-powered bicycle or an electric bicycle. In some embodiments, the bicycle control device 110 may directly access the data and/or information stored in the storage device 150. In some embodiments, the bicycle control device 110 may also access the data and/or information stored in the requester terminal 130 or the service provider 140 directly via the network 120.

In some embodiments, the service provider 140 may include a plurality of service providers 140-1, 140-2, . . . , 140-n. In some embodiments, the service provider 140 may include a device that is similar to, or the same as the requester terminal 130. The service provider 140 may include one or more sensors. The one or more sensors may include a gyroscope, an accelerometer, a global positioning system (GPS), a pressure sensor, a light sensor, a temperature sensor, a fingerprint sensor, an image sensor, an iris sensor, or the like, or any combination thereof. In some embodiments, the requester terminal 130 and/or the service provider 140 may communicate with one or more other positioning devices to determine the position of the service requester, the requester terminal 130, and/or the service provider 140. In some embodiments, the requester terminal 130 and/or the service provider 140 may periodically transmit position information to the bicycle control device 110. In some embodiments, the service provider 140 may also periodically transmit an availability status to the bicycle control device 110. The availability status may indicate whether a bicycle correspond to the service provider 140 is available. For example, the requester terminal 130 and/or the service provider 140 may transmit position information and availability status to the bicycle control device 110 every 30 minutes. As another example, the requester terminal 130 and/or the service provider 140 may transmit position information and availability status to the bicycle control device 110 when the service requester logs in a mobile application to online request for a transportation service.

In some embodiments, the service provider 140 may include but not limited to a sensor array 141, a microprocessor, an electric control device, a positioning device, a wireless communication module, or the like, or any combination thereof. The sensor array 141 may include but not limited to a pressure sensor and a motion sensor. The sensor array 141 may include one or more pressure sensors. The one or more pressure sensors may be mounted on a seat, a wheel, a basket, a pedal, or a frame of a bicycle. The pressure sensor is configured to detect the pressure load on the bicycle, and generate electrical signal(s) indicative of the pressure load. For example, the pressure sensor mounted on the seat may detect the pressure load on the seat (e.g., a weight of the user on the seat). As another example, the pressure sensor mounted on the basket bottom may detect the pressure load in the basket (e.g., a weight of articles placed in the basket). The motion sensor may connect to the microprocessor. The motion sensor is configured to obtain motion signal(s) of the bicycle (e.g., an electric bicycle), and generate electrical signal(s) indicative of the motion signal(s). The motion signal(s) may include but not limited to speed signal(s), acceleration signal(s), attitude angle signal(s), or the like, or any combination thereof. In some embodiments, the motion sensor includes at least one of a gravity sensor, an acceleration sensor, a speed sensor, or a gyroscope. The gravity sensor is configured to detect the gravitational acceleration of the bicycle, and generate the electrical signals indicative of the gravitational acceleration. The acceleration sensor is configured to detect the acceleration of the bicycle, and generate the electrical signals indicative of the acceleration. The acceleration may be represented in three directions (e.g., x-axis, y-axis, z-axis). The speed sensor is configured to detect the speed of the bicycle, and generate the electrical signals indicative of the speed. The gyroscope is configured to detect the motion attitude of the bicycle, and generate the electrical signals indicative of the motion attitude.

In some embodiments, the microprocessor may be configured to generate or obtain at least one access permission level based on the generated electrical signal (e.g., the electrical signal regarding the pressure). The access permission level may indicate that functions or features of the bicycle that the service requester is available to use. The access permission level may include a first access permission level (i.e., "no use of the bicycle") indicating that the service requester can't use the bicycle, a second access permission level (i.e., "limited use of the bicycle") indicating that the service requester can use a part of the bicycle's functions, a third access permission level (i.e., "full use of the bicycle") indicating that the service requester can use all of the bicycle's functions, a fourth access permission level (i.e., "terminated use") indicating that the service requester finishes using the bicycle.

In some embodiments, the electric control device may be configured to control at least one electric control component of the bicycle based on the at least one access permission level. The electric control component includes at least one of a lock, a braking device, or an electric motor. In some embodiments, the positioning device may connect to the microprocessor. The positioning device may be configured to obtain position information of the bicycle. The positioning device may include but not limited to a global positioning system (GPS), a BeiDou Navigation Satellite System (BDS), a GLONASS satellite navigation system (GLONASS), or the like, or any combination thereof. In some embodiments, the wireless communication module may connect to the microprocessor. The wireless communication module may include but not limited to a Bluetooth network, a WI-FI network, a ZigBee network, a Near Field Communication (NFC) network, a WiMax network, a WLAN network, a cellular network (e.g., 2G, 3G, 4G, or 5G, etc.), a General Packet Radio Service Technology (GPRS), or the like, or any combination thereof.

In some embodiments, the microprocessor may control at the least one electric control component of the bicycle based on the pressure signal. In some embodiments, the microprocessor may control an operation for returning the bicycle based on the pressure signal and the position information. In some embodiments, the microprocessor may control the at least one electric control component of the bicycle based on the pressure signal and the motion signal.

In some embodiments, the storage device 150 refers to a device that has a storage function. The storage device 150 may be configured to store data collecting from the requester terminal 130 and/or the service provider 140, and various data generated by the bicycle control device 110. The storage device 150 may be local or remote. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

It should be noted that the storage device 150 may communicate with other components in the system (e.g., the requester terminal 130, the service provider 140, or the bicycle control device 110) through a wired or wireless network. The network 120 may be a single network or a combination of multiple networks. For example, the network 120 may include a local area network (LAN), a wide area network (WAN), a public network, a private network, a proprietary network, a wireless network, a virtual network, a public switched telephone network (PSTN), or any combination thereof. The network 120 may include one or more network access points, such as wired or wireless network access points, base stations and/or internet exchange points (e.g., 120-1, 120-2) through which one or more components of the bicycle service system 100 may be connected to the network 120 to exchange data and/or information.

Figure 2:
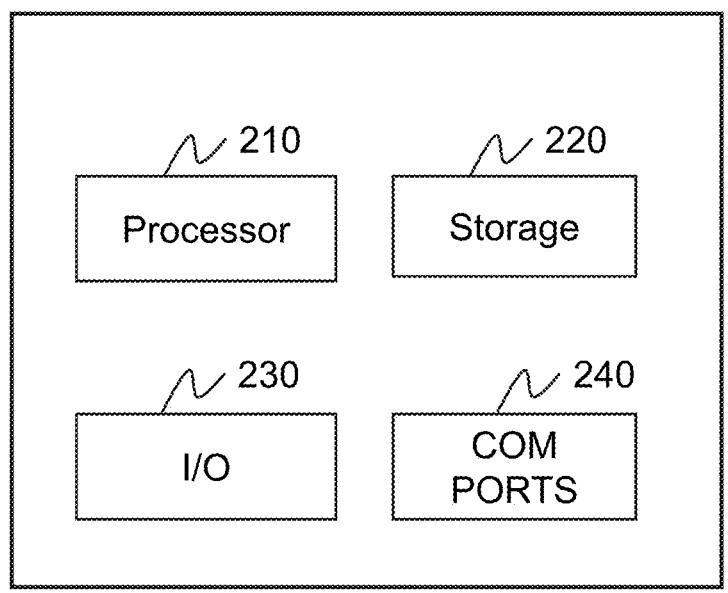
FIG. 2 is a block diagram illustrating exemplary components of a computing device according to some embodiments of the present disclosure.

FIG. 2 is a block diagram illustrating exemplary components of a computing device according to some embodiments of the present disclosure. As shown in FIG. 2, computing device 200 may include a processor 210, a storage 220, an I/O interface 230, and a communication port 240. It should be understood that the bicycle control device 110, the requester terminal 130, the service provider 140, and/or the storage device 150 may be implemented on the computing device 200 according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure.

The processor 210 may be configured to execute a set of instructions (or program codes) to implement one or more functions of the bicycle service system 100 disclosed in the present disclosure. The instructions may include routines, programs, objects, components, data structures, procedures, modules, and functions, which perform particular functions disclosed in the present disclosure. For example, the processor 210 may process image or text data obtained from any component of the bicycle service system 100. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. Merely for illustration, only processor is illustrated in FIG. 2. It should be noted that the computing device 200 may also include multiple processors.

The storage 220 may store data/information obtained from any component of the bicycle service system 100. In some embodiments, the storage 220 may include a mass storage, a removable storage, a volatile read-and-write storage, a read only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc.

The I/O interface 230 may be configured to input or output signals, data or information. In some embodiments, the I/O interface 230 may enable a user to communicate with the bicycle service system 100. In some embodiments, the I/O interface 230 may include an input device and an output device. Exemplary input device may include a keyboard, a mouse, a touch screen, a microphone, or the like, or any combination thereof. Exemplary output device may include a display device, a loudspeaker, a printer, a projector, or the like, or any combination thereof. Exemplary display device may include a liquid crystal display (LCD), a light-emitting diode (LED)-based display, a flat panel display, a curved screen, a television device, a cathode ray tube (CRT), or the like, or any combination thereof. The communication port 240 may connect to a network to facilitate data communication. The connection may be a wired connection, a wireless connection, or a combination of both. The wired connection may include an electrical cable, an optical cable, a telephone wire, or the like, or any combination thereof. The wireless connection may include a Bluetooth network, a Wi-Fi network, a WiMax network, a WLAN network, a ZigBee network, a cellular network (e.g., 2G, 3G, 4G, 5G, etc.), or the like, or any combination thereof. In some embodiments, the communication port 240 may be a standardized communication port, such as RS232, RS485, etc. In some embodiments, the communication port 141 may be a specially designed communication port. For example, the communication port 240 may be designed in accordance with the digital imaging and communications in medicine (DICOM) protocol.

Figure 3:
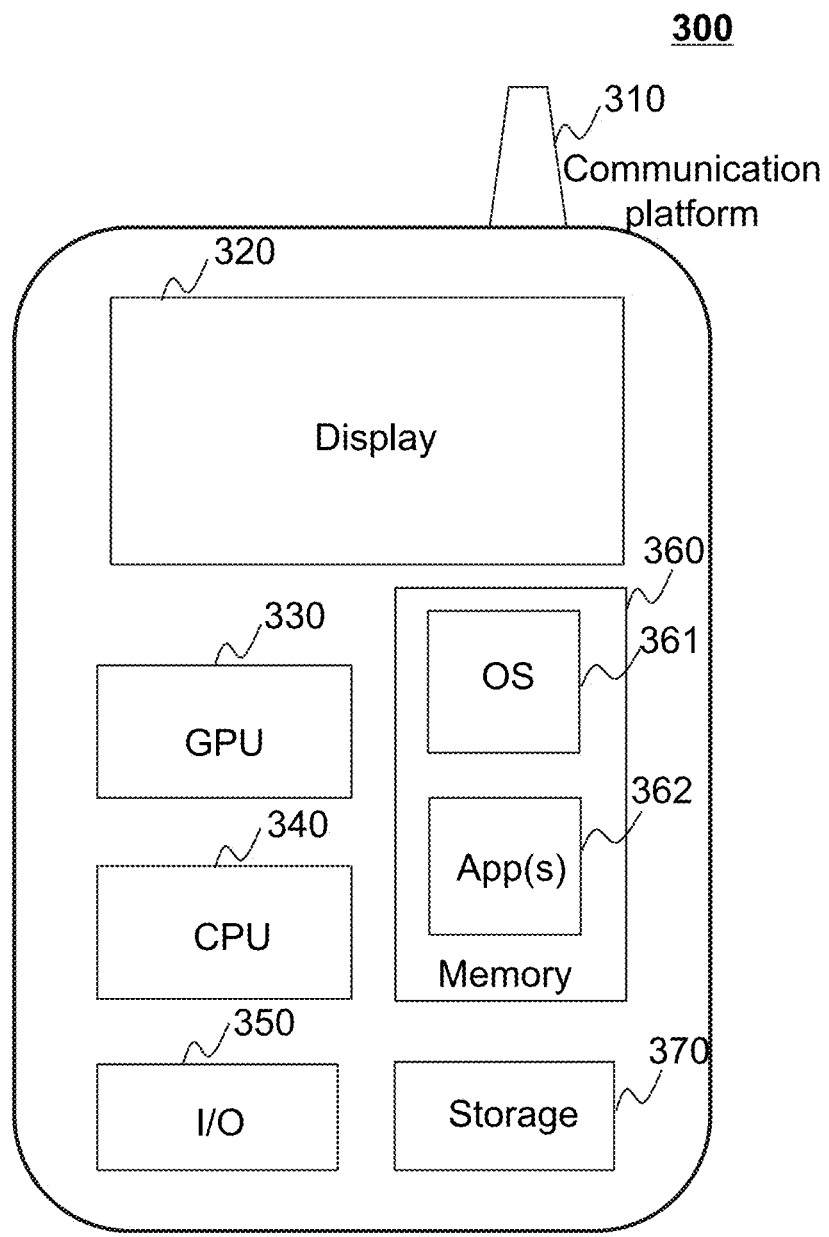
FIG. 3 is a block diagram illustrating exemplary hardware and/or software components of an exemplary mobile device according to some embodiments of the present disclosure.

FIG. 3 is a block diagram illustrating exemplary hardware and/or software components of an exemplary mobile device according to some embodiments of the present disclosure. As shown in FIG. 3, the mobile device 300 may include a communication module 310, a display 320, a graphics processing unit (GPU) 330, a central processing unit (CPU) 340, an I/O interface 350, a memory 360, a storage 370. In some embodiments, an operating system 361 (e.g., iOS™, Android™, Windows Phone™) and one or more applications 362 may be loaded into the memory 360 from the storage 390 in order to be executed by the CPU 340. The applications 362 may include a browser or other applications for receiving imaging, graphics processing, audio, or other related information from bicycle service system 100.

In order to implement various modules, units and their functions described above, a computer hardware platform may be used as hardware platforms of one or more elements. Since these hardware elements, operating systems, and program languages are common, it may be assumed that persons skilled in the art may be familiar with these techniques and they may be able to provide information required in service request allocation according to the techniques described in the present disclosure. A computer with user interface may be used as a personal computer (PC), or other types of workstations or terminal devices. After being properly programmed, a computer with user interface may be used as a server.

In some embodiments, when a service requester uses a bicycle (e.g., rides on an electric bicycle or a human-powered bicycle), the service requester's weight will produce pressure signals that indicate the service requester's weight. The access permission levels regarding the bicycle are determined based on the pressure signals. The access permission level may indicate functions or features of the bicycle available for the service requester to use. The electric control components of the bicycle are operated based on the access permission levels. It may effectively prevent too young child from using the bicycle, and/or avoid security risks caused by an illegitimate overload (e.g., multiple people ride on a single bicycle).

In some embodiments, when one or more heavy articles are placed in a bicycle basket (generally disposed in front of a bicycle handlebar), the operational flexibility of the handlebar may be seriously compromised during ride. The one or more heavy articles will produce pressure signals, indicating the one or more heavy articles' weights on the bottom of the bicycle basket. The access permission levels regarding the bicycle are determined based on the pressure signals. The electric control components of the bicycle are controlled based on the access permission levels. It may effectively avoid safety risks caused by the inability to control the bicycle freely when too heavy article(s) placed in the basket.

It should be noted that the bicycle mentioned above may include a human-powered bicycle, and/or an electric-powered bicycle (i.e., an electric bicycle). The human-powered bicycle refers to a bicycle that generates a driving force by driving the pedals of the bicycle. The speed of the bicycle may be adjusted by a braking device or a frequency stepping the pedal(s). The braking device may be configured to reduce the speed of the bicycle. In some embodiments, the braking device may include a mechanical brake, which may control a distance between a brake block and the wheel under the mechanical force, and further change the frictional resistance between the wheel and the brake block, so that achieving the braking effect. In some embodiments, the braking device may include an electronically controlled brake, which may control a distance between a brake block and the wheel under a received electronic control signal, and further change the frictional resistance between the wheel and the brake block, so that achieve the braking effect. In some embodiments, the brake block may be composed of rubber materials. By contrast with the human-powered bicycle, the electric bicycle refers to a bicycle configured with an electric motor, a controller, a battery, a steering handle (or similar manipulating members), and a display device. The battery is used as an auxiliary energy to supply power to the electric motor. The controller may generate a control signal to control the motion of the electric motor, in order to drive the electric bicycle.

The access permission level may include a first access permission level (i.e., "no use of the bicycle") indicating that the service requester can't use the bicycle, a second access permission level (i.e., "limited use of the bicycle") indicating that the service requester can use a part of the bicycle's functions, a third access permission level (i.e., "full use of the bicycle") indicating that the service requester can use all of the bicycle's functions, a fourth access permission level (i.e., "terminated use") indicating that the service requester finishes using the bicycle. The electric control components may include a lock, a brake device or an electric motor. For example, when the first access permission level is determined based on the pressure signal, which may direct the controller not to unlock the bicycle so that the service requester can't use the bicycle. As another example, when the second access permission level is determined based on the pressure signal, which may direct a motor controller (e.g., motor controller 1130) to control the turning speed of the electric motor to limit the speed of the bicycle to a relatively low speed so that the use of the bicycle is limited (e.g., some functions are disable upon occurrence of the second access permission level). As a further example, when the fourth access permission level is determined based on the pressure signal, which may direct the controller to lock the bicycle so that completes an operation for returning the bicycle.

In the following, various embodiments disclosed in the present disclosure are illustrative, and not intended to be limiting.

Figure 4:
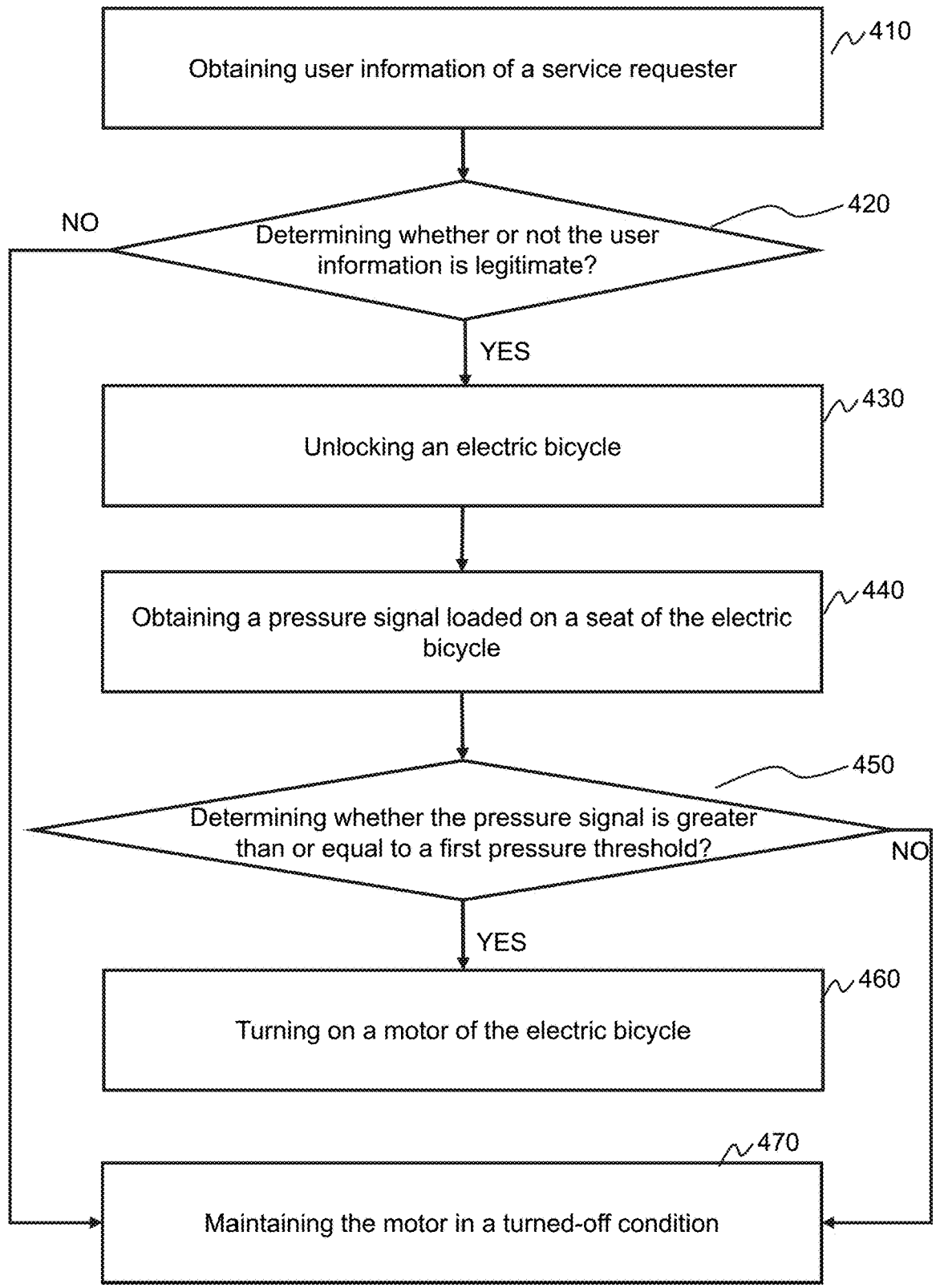
FIG. 4 is a flowchart illustrating an example process for controlling an electric bicycle according to some embodiments of the present disclosure.

FIG. 4 is a flowchart illustrating an example process for controlling an electric bicycle according to some embodiments of the present disclosure. In some embodiments, process 400 may be implemented in the bicycle service system 100. For example, the process 400 may be stored in the storage device 150 and/or the storage 220 in the form of instructions, and invoked and/or executed by the bicycle control device 110 (e.g., the processing device 112 of the bicycle control device 110, or the processor 210 of the computing device 200).

In 410, user information of a service requester may be obtained. In some embodiments, operation 410 may be performed by a user information obtaining sub-module of a verification module 1230 illustrated in FIG. 12. In some embodiments, the user information may be obtained by a requester terminal 130 or a verification device of the service provider 140.

In some embodiments, one or more travel platform applications may be installed in the requester terminal 130 (e.g., a mobile phone, a tablet computer, etc.) of the service requester. The travel platform application may refer to a mobile application in connection with the bicycle service system 100. The service requester may use the travel platform application to request a transportation service (e.g., bicycle sharing services). The travel platform application may collect or obtain the user information of the service requester. The travel platform application may include a plurality of travel modes, for example, an electric bicycle, a human-powered bicycle, a premier vehicle, a taxi, a carpool, a shuttle bus, or the like, or any combination thereof. The requester terminal 130 may communicate with the bicycle service system 100 via a communication port (e.g., the communication port 240), and transmit the collected or obtained user information to one or more components of the bicycle service system 100 via the communication port, for example, the processing engine 112, the bicycle control device 110, the storage device 150, and so on.

In some embodiments, the verification device is installed in the service provider 140. The verification device may collect or obtain the user information of the service requester. The verification device may include but not limited to an input device, a pupil collection device, a fingerprint collection device, a face recognition device, or the like, or any combination thereof. The verification device may communicate with the bicycle service system 100 via a communication port (e.g., the communication port 240), and transmit the collected or obtained user information to one or more components of the bicycle service system 100 via the communication port, for example, the processing engine 112, the bicycle control device 110, the storage device 150, and so on.

In some embodiments, the user information of the service requester may include a user identifier (or a user ID), a user password, user physiological information, or the like, or any combination thereof. The user ID may include a unique identifier assigned to service requester registered in the travel platform application. The password may include a verification code or dynamic password that the travel platform applications provide for the service requester. The password may include characters, digits, punctuation marks, or the like, or any combination thereof. In some embodiments, the dynamic password may only be used once, and it would be disable after a successful verification. The physiological information may include a fingerprint, a face, an iris, or the like, or any combination thereof.

In 420, whether or not the user information is legitimate may be determined. In some embodiments, operation 420 may be performed by a user information verification sub-module of the verification module 1230 illustrated in FIG. 12. If the user information is verified as legitimate, operation 430 may proceed. If the user information is verified as illegitimate, operation 470 may proceed.

In some embodiments, the user information verification sub-module may compare the obtained user information of the service requester in operation 410 with user information of a legitimate user, and determine whether or not the obtained user information of the service requester is legitimate. The legitimate user may refer to a user registered in the bicycle service system 100 in advance. The legitimate user may be authorized to use the bicycle corresponding to the service provider 140 (e.g., the electric bicycle) after passing the verification of the bicycle service system 100. In some embodiments, the processing engine 112 may obtain the user information of the legitimate user from a storage device (e.g., the storage device 150) of the bicycle service system 100. For example, the processing engine 112 may obtain the user information of the legitimate user from the storage device (e.g., the storage device 150) of the bicycle service system 100 by retrieving a unique identifier of the electric bicycle (e.g., a bicycle ID). The processing engine 112 may also determine directly whether the obtained user information of the service requester satisfies the user information of the legitimate user in the storage device (e.g., the storage device 150) of the bicycle service system 100, and perform a verification operation for the user information.

In some embodiments, the user information of the legitimate user may include a user ID, a password, a physiological information, or the like, or any combination thereof. The user ID of the legitimate user may include a unique identifier assigned to the legitimate user registered in the travel platform application. The password of the legitimate user may include a verification code or dynamic password that the travel platform applications provide for the legitimate user. The password may include characters, digits, punctuation marks, or the like, or any combination thereof. In some embodiments, the dynamic password may only be used once, and it would be disable after a successful verification. The physiological information of the legitimate user may include a fingerprint, a face, an iris, or the like, or any combination thereof.

In some embodiments, the user information verification sub-module may compare the password input by the service requester with the obtained password from the storage device 150 of the bicycle service system 100. If the two passwords are the same (such as, characters, digits, punctuation marks are consistent and in the same order), the obtained user information of the service requester is verified as legitimate. Otherwise, the obtained user information of the service requester is verified as illegitimate. The password may be input by the requester terminal 130 of the service requester or the input device of the electric bicycle.

In some embodiments, the user information verification sub-module may compare the fingerprint input by the service requester with the obtained fingerprint of the legitimate user from the storage device 150 of the bicycle service system 100. When a similarity of the two fingerprints exceeds a fingerprint threshold, the obtained user information of the service requester is verified as legitimate. Otherwise, the obtained user information of the service requester is verified as illegitimate. The fingerprint may be input by the requester terminal 130 of the service requester or the fingerprint collection device of the electric bicycle. In some embodiments, the fingerprint threshold may be predetermined by the bicycle service system 100, or may be adjusted in different scenarios. For example, the fingerprint threshold may be 92%, 95%, 98%, and so on.

In some embodiments, if the electric bicycle does not have a legitimate user, the user information verification sub-module can't find this user's related information in the storage device 150 of the bicycle service system 100, the obtained user information of the service requester is verified as illegitimate.

In 430, the electric bicycle may be unlocked. In some embodiments, operation 430 may be performed by a control module 1220 illustrated in FIG. 12.

When the electric bicycle is not provided for the shared use (e.g., the electric bicycle to be reserved), the electric bicycle is in a lock condition. For example, the wheel(s) of the electric bicycle may be locked to a fixed pole by a lock, which can't allow the electric bicycle to move. As another example, the wheel(s) of the electric bicycle may be locked by the lock, which can't allow the electric bicycle to move. In some embodiments, the lock may include an electronically controlled lock. The electronically controlled lock may be turned on or turned off based on an electrical signal generated by the microprocessor. For example, when the verification module 1230 determines that the user information is legitimate, an unlock control signal may be generated. The electronically controlled lock may be turned on in response to the unlock control signal.

In 430, the control module 1220 may turn on the lock of the electric bicycle. The wheels of the electric bicycle may roll, and the electric bicycle may move, for example, the service requester moves the bicycle under the unlock condition. In a certain embodiment, when the user information of the service requester is verified successfully, for a legitimate user, the lock of the electric bicycle is turned on, while the electric motor of the electric bicycle is not yet turned on, in the case, the electric bicycle may not be normally riding. In some embodiments, whether to drive the electric bicycle may be further determined based on a verification result regarding the service requester's weight. It may effectively prevent a minor (e.g., a young child) from using the electric bicycle, and ensure usage safety of the electric bicycle to a certain extent.

In 440, the pressure signal loaded on at least one part of the electric bicycle (for example, the seat) may be obtained. In some embodiments, the weight of the service requester may be determined based on obtained the pressure signal. In some embodiments, an age of the service requester may be determined based on the weight of the service requester.

In some embodiments, operation 440 may be performed by an obtaining module 1210. The sensor array 141 may generate the pressure signal. In some embodiments, a pressure sensor of the sensor array 141 generates the pressure signal. The pressure sensor may include a piezoresistive force sensor, a ceramic pressure sensor, a diffused silicon pressure sensor, a sapphire pressure sensor, a piezoelectric pressure sensor, or the like, or any combination thereof. Taking the ceramic pressure sensor as an example, when the service requester sits on the electric bicycle, a pressure load (e.g., a weight of the service requester) may cause a front surface of the ceramic diaphragm to produce a slight deformation. The front surface connects to a thick film resistor printed on a back surface of the ceramic diaphragm, which forms a Wheatstone bridge. Due to the piezoresistive effect of the varistor, the bridge may produce a voltage signal, which is linearly proportional to the pressure and proportional to the excitation voltage.

The pressure sensor may be mounted on a seat, a tire, a basket bottom, a pedal or a frame. For example, the pressure sensor is mounted in a cushion interlayer of the seat. When the service requester sits on the seat cushion, the pressure sensor may detect the pressure load, convert the pressure load to corresponding electrical signal, and output the electrical signal to the microprocessor of the electric bicycle for further processing. As another example, the pressure sensor may also mounted on the pedal, the pressure collected by the pressure sensor may indicate the service requester's weight. The microprocessor may process the electrical signal output by the pressure sensor, for example, determine a value proportional to or linearly regarding the service requester's weight. As a further example, the pressure sensor may be mounted on the basket bottom (e.g., a center region of the bottom, and/or four corners of the bottom). When an article is placed in the basket, the pressure sensor may detect corresponding pressure load, and convert the pressure load to the electrical signal. The electrical signal may be output to the microprocessor of the electric bicycle. The pressure collected by the pressure sensor may indicate the weight of the article(s) in the basket, which is used to determine whether the article(s) in the basket is overweight. It may reduce a possibility of damage to the basket and avoid the security risks during the riding.

The pressure sensor may be configured to detect the pressure loaded on the electric bicycle, and generate corresponding electrical signal indicative of the pressure. The pressure signal may be stored in a storage device (e.g., the storage device 150) of the bicycle service system 100 via a communication port (e.g., the communication port 240).

In 450, the access permission level regarding the electric bicycle may be determined based on the pressure signal. In some embodiments, operation 450 may be performed by the control module 1220 illustrated in FIG. 12.

In some embodiments, in 450, the control module 1220 may determine whether the pressure signal is greater than or equal to a first pressure threshold. If the pressure signal is greater than or equal to the first pressure threshold, the control module 1220 may determine an access permission level indicating that the service requester can use all of the bicycle's functions (i.e., "full use of the bicycle" mentioned above). Operation 460 may proceed. In response to the access permission level, i.e., "full use of the bicycle", the electric bicycle may turn on all functions for the service requester. If the pressure signal is less than the first pressure threshold, the control module 1220 may determine an access permission level indicating that the service requester can't use the bicycle (i.e., "no use of the bicycle" mentioned above). Operation 470 may proceed. In response to the access permission level, i.e., "no use of the bicycle", the electric bicycle may turn off all functions for the service requester. In some embodiments, the bicycle service system 100 may predetermine the first pressure threshold or adjust the first pressure threshold in different scenarios. In some embodiments, the first pressure threshold may be used to determine whether the service requester is an adult or whether her/his weight satisfies a requirement allowable to ride the electric bicycle. For example, the first pressure threshold may be 40 Kg, 43 Kg, 45 Kg, and so on.

In 460, an electric motor of the electric bicycle may be turned on. In some embodiments, operation 460 may be performed by the control module 1220.

The electric motor of the electric bicycle may be in a turned-off condition before the pressure caused by the service requester is verified. In some embodiments, although the use information is verified, the legitimate service requester may only walk the electric bicycle, and may not turn on the electric motor of the electric bicycle.

If the control module 1220 determines that the pressure signal is greater than or equal to the first pressure threshold, the verification based on the pressure is passed. The control module 1220 may turn on the electric motor of the electric bicycle. After the electric motor is turned on, the service requester may perform a series of control operations for the electric motor, such as an acceleration operation, a deceleration operation, a braking operation, and so on. The electric motor may drive the electric bicycle to move or stop.

If the pressure signal is less than the first pressure threshold, operation 470 may be proceeded by the control module 1220. The control module 1220 may direct the electric motor to be in the turned-off condition.

In some embodiments, when the pressure signal is less than the first pressure threshold, the electric motor may maintain the turned-off condition because the service requester's weight is underweight. It may effectively prevent some people (for example, a young child) who are not suitable for riding the electric bicycle.

It should be noted that, the pressure detection regarding the electric bicycle may be performed periodically during riding. For example, the pressure sensor may detect the pressure signal and output the pressure signal to the microprocessor in a certain time interval. The electric motor may be controlled based on the pressure signal. The time interval may be preset, for example, three minutes, five minutes, and so on. In some embodiments, each time interval may be in an equal time length. In some embodiments, the time intervals may be in different time lengths. In some embodiments, the pressure detection regarding the electric bicycle may be performed real time or near-real time during riding.

Figure 5:
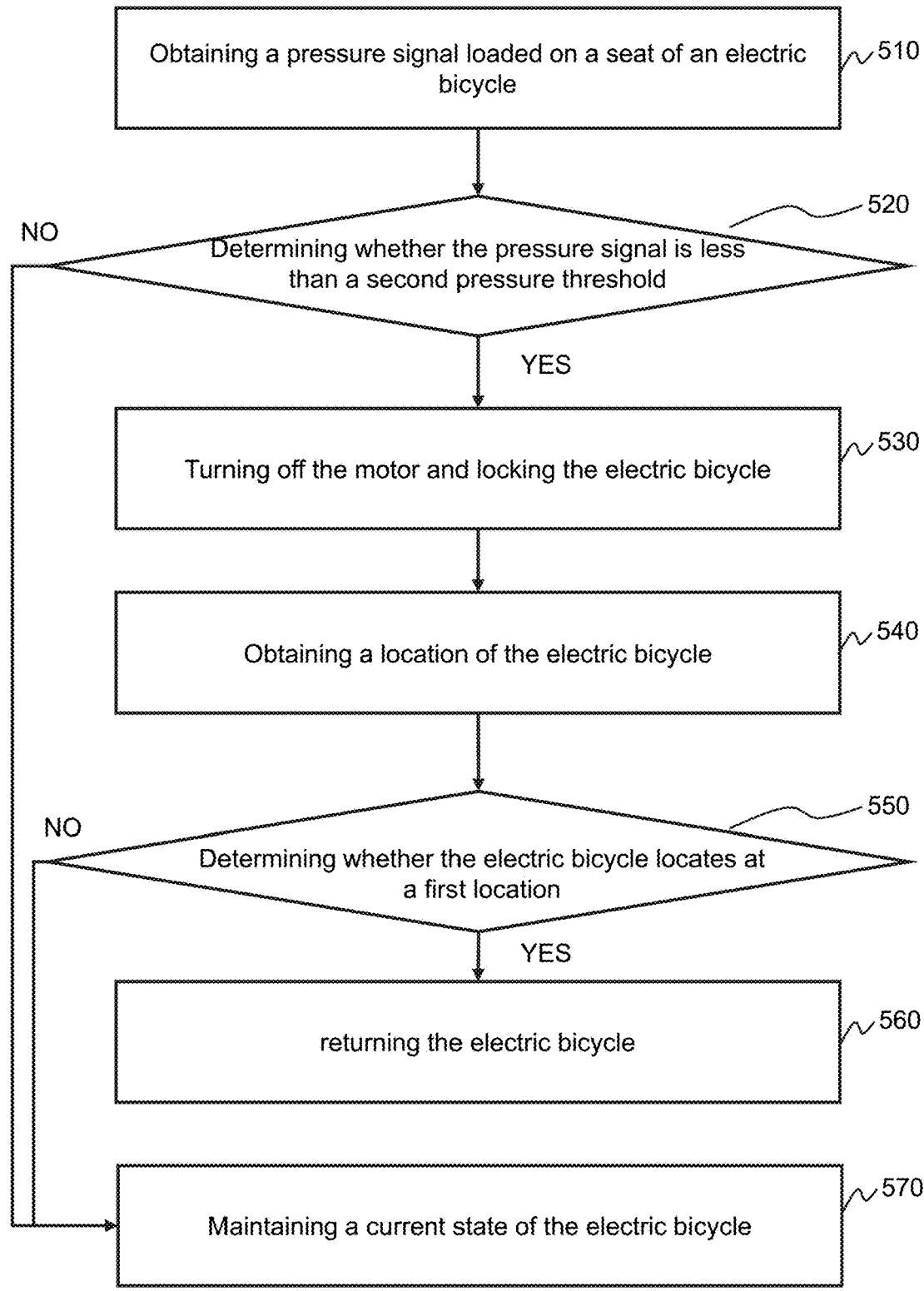
FIG. 5 is a flowchart illustrating an example process for controlling an electric bicycle according to some embodiments of the present disclosure.

FIG. 5 is a flowchart illustrating an example process for controlling an electric bicycle according to some embodiments of the present disclosure. In some embodiments, process 500 may be implemented in the bicycle service system 100. For example, the process 500 may be stored in the storage device 150 and/or the storage 220 in the form of instructions, and invoked and/or executed by the bicycle control device 110 (e.g., the processing device 112 of the bicycle control device 110, or the processor 210 of the computing device 200).

In 510, the pressure signal loaded on at least one part of the electric bicycle (e.g., the seat) may be obtained. In some embodiments, operation 510 may be performed by an obtaining module 1210 illustrated in FIG. 12. The bicycle service system 100 may determine whether the service requester gets off the seat according to the pressure signal loaded on at least one part of the electric bicycle (e.g., the seat).

The sensor array 141 may generate the pressure signal. In some embodiments, a pressure sensor of the sensor array 141 generates the pressure signal. The pressure sensor may mounted on a seat, a wheel, a basket bottom, a pedal or a frame of the electric bicycle. The pressure sensor may be configured to detect the pressure loaded on the electric bicycle, and generate corresponding electrical signal indicative of the pressure. The pressure signal may be stored in a storage device (e.g., the storage device 150) of bicycle service system 100 via a communication port (e.g., the communication port 240).

In 520, whether the pressure signal is less than a second pressure threshold may be determined. In some embodiments, operation 520 may be performed by an control module 1220 illustrated in FIG. 12. If the pressure signal is less than the second pressure threshold, the control module 1220 may determine an access permission level indicating that the service requester finishes using the bicycle (i.e., "terminated use" mentioned above). The operation 530 may be proceeded. In response to the access permission level of the "terminated use", the electric bicycle need be returned to a station in connection with the bicycle service system 100 (e.g., a first location) after the service requester finish using the electric bicycle. If the pressure signal is greater than or equal to the second pressure threshold, operation 570 may proceed. In some embodiments, the bicycle service system 100 may predetermine the second pressure threshold or adjust the second pressure threshold in different scenarios. In some embodiments, the second pressure threshold may be less than the first pressure threshold. For example, the second pressure threshold may be 5 Kg, 10 Kg, 15 Kg, and so on. In some embodiments, the second pressure threshold may be equal to the first pressure threshold.

In 530, an electric motor of the electric bicycle may be turned off and the electric bicycle may be locked by a lock. In some embodiments, operation 530 may be performed by the control module 1220.

In some embodiments, the control module 1220 may turn off the electric motor of the electric bicycle. Once the electric motor of the electric bicycle is turned off, the service requester can't control the electric motor again, the electric bicycle can't be driven by the electric motor accordingly. The control module 1220 may lock the electric bicycle to disable the movement of the wheels, which may prevent others from riding or walking the electric bicycle.

In some embodiments, when the pressure signal is less than the second pressure threshold, the control module 1220 may determine that the service requester gets off the bicycle. If the service requester forgets to lock the bicycle when he/she gets off the bicycle temporarily, which may cause economic losses to the service provider. Therefore, the electric bicycle may be locked actively based on the pressure signal and/or the access permission level of the "terminated use", which may effectively avoid or reduce issue above.

In some embodiments, when the pressure signal is less than the second pressure threshold, the control module 1220 may determine that the service requester no longer needs to use the electric bicycle. In operations 510-530, processes for returning the electric bicycle may proceed.

In 540, a location of the electric bicycle may be obtained. In some embodiments, operation 540 may be performed by a returning module 1240 illustrated in FIG. 12.

In some embodiments, the returning module 1240 may obtain the location of the electric bicycle through a positioning device. The positioning device may include a Global Positioning System (GPS). The positioning device may output location information to the microprocessor for further processing.

In 550, whether the electric bicycle locates at a first location may be determined. Operation 550 may be performed by the returning module 1240. If the electric bicycle is at the first location, operation 560 may proceed. If the electric bicycle is not at the first location, operation 570 may proceed. In some embodiments, the first location relates to a return location that is a station in connection with the bicycle service system 100. The first location may be set by the bicycle service system 100. The first location may include a destination of a current trip. The first location may be adjusted in different scenarios. In some embodiments, if the electric bicycle locates in a circle region whose center is the first location and radius is a first location threshold, it is considered that the electric bicycle is at the first location. In some embodiments, the first location threshold may be preset by the bicycle service system 100. The first location threshold may be adjusted in different scenarios. The first location threshold may include 3 m, 5 m, 10 m, and so on.

In 560, returning the electric bicycle may be performed. In some embodiments, operation 560 may be performed by the returning module 1240 illustrated in FIG. 12.

In some embodiments, when the service requester gets off the electric bicycle and the electric bicycle is at the first location, the returning module 1240 may determine that the returning of the electric bicycle is successful. The returning module 1240 may automatically end the use of the electric bicycle, which may not require the service requester to perform more operations related to returning the bicycle.

In some embodiments, the first location may be preset by the bicycle service system 100. For example, the bicycle service system 100 may specify one or more stations for returning the bicycle. When the electric bicycle is at the one or more stations, the use of the electric bicycle may be ended, which facilitates the recovery and maintenance of the bicycle, and solves the problem of the illegal parking of the electric bicycle.

In some embodiments, the first location may be the destination of the current trip. The destination of the trip may be input by the service requester. For example, the current trip destination of the service requester is "A subway station", and the service requester may designate "A subway station" as the first location. When the service requester arrives at the "A subway station" and gets off the bicycle, the returning operation regarding the bicycle may be automatically completed which does not require the service requester to perform more returning operations.

In 570, a current state of the electric bicycle may be maintained, and the returning of the bicycle may not be performed.

In some embodiments, when the pressure signal is greater than or equal to the second pressure threshold (in operation 520), it is considered that the service requester is riding the electric bicycle, therefore a normal turned-on condition of the bicycle need be maintained. For example, the access permission level of "full use of the bicycle" may be maintained, and the electric bicycle may turn on-all functions for the service requester.

In some embodiments, when the electric bicycle is not at the first location, it is considered that the service requester may not have an intention to end the use of the bicycle, or have no condition to end the use of the bicycle. For example, if the service requester temporarily stops, the control module 1220 turns off the electric motor of the electric bicycle, and the control module 1220 locks the electric bicycle, but still maintains the use right of the bicycle (e.g., continues to bill), which may ensure that the bicycle is not stolen and retain the usage right of the bicycle at the same time. As another example, when the service requester has an intention to end the use of the electric bicycle, but does not have the condition to end the use of the electric bicycle (for example, fails to reach the first location), the control module 1220 turns off the electric motor of the electric bicycle and locks the electric bicycle, but still maintains the usage right of the electric bicycle. The service requester may end the use of the electric bicycle until the electric bicycle arrives at the first location.

In some embodiments, when the pressure signal is less than the second pressure threshold, it is considered that the service requester no longer needs to use the electric bicycle, the returning module 1240 may directly transmit information indicative of a successful returning regarding the bicycle to a server through a wireless communication module. Before the electric bicycle transmits the information indicative of a successful returning regarding the bicycle, the control module 1220 may turns off the electric motor of the electric bicycle and locks the electric bicycle, which may provide quick and easy return of the bicycle.

In some embodiments, the detection of the pressure signal may be performed in real time or periodically during riding the bicycle. For example, when the speed of the bicycle reaches a certain value, the pressure detection may be performed, which may avoid or reduce illegal overload (e.g., multiple people share a single bicycle) during the riding.

Figure 6:
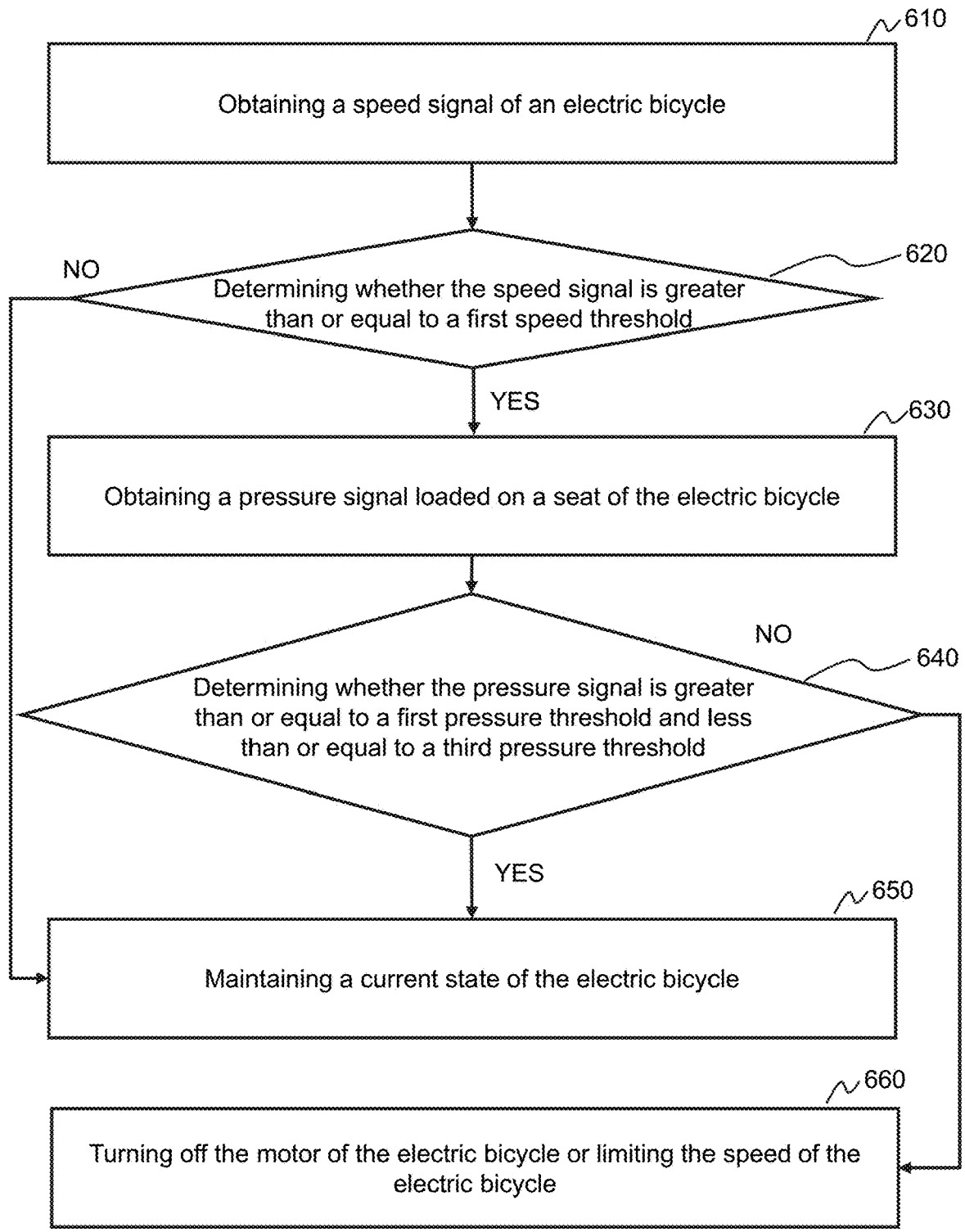
FIG. 6 is a flowchart illustrating an example process for controlling an electric bicycle according to some embodiments of the present disclosure.

FIG. 6 is a flowchart illustrating an example process for controlling an electric bicycle according to some embodiments of the present disclosure. In some embodiments, process 600 may be implemented in the bicycle service system 100. For example, the process 600 may be stored in the storage device 150 and/or the storage 220 in the form of instructions, and invoked and/or executed by the bicycle control device 110 (e.g., the processing device 112 of the bicycle control device 110, or the processor 210 of the computing device 200).

In 610, a speed signal of the electric bicycle may be obtained. In some embodiments, operation 610 may be performed by a control module 1220 illustrated in FIG. 12.

The sensor array 141 may generate the speed signal. In some embodiments, a speed sensor of the sensor array 141 may generate the speed signal. The speed sensor may detect the speed of the bicycle, and generate a corresponding electrical signal. The electrical signal may be output to the microprocessor of the bicycle for further processing. The speed sensor may include but is not limited to a magnetoelectric speed sensor, a Hall type speed sensor, a photoelectric sensor, or the like, or any combination thereof. In some embodiments, the speed may be determined based on the position information and time information regarding the bicycle. The speed signal may be stored in a storage device (e.g., the storage device 150) of the bicycle service system 100 through a communication port (e.g., the communication port 240).

In 620, an access permission level regarding the electric bicycle may be determined based on the speed signal. Operation 620 may be performed by the control module 1220. The access permission level may include a first access permission level (i.e., "no use of the bicycle") indicating that the service requester can't use the bicycle, a second access permission level (i.e., "limited use of the bicycle") indicating that the service requester can use a part of the bicycle's functions, a third access permission level (i.e., "full use of the bicycle") indicating that the service requester can use all of the bicycle's functions, a fourth access permission level (i.e., "terminated use") indicating that the service requester finishes using the bicycle.

In a certain embodiment, in 620, the control module 1220 may determine whether the speed signal is greater than or equal to a first speed threshold. If the speed signal is greater than or equal to the first speed threshold, operation 630 may proceed. If the speed signal is less than the first speed threshold, operation 650 may proceed. In some embodiments, the first speed threshold may preset by the bicycle service system 100. The first speed threshold may be adjusted in different scenarios. For example, the first speed threshold may be 20 Km/h, 25 Km/h, 30 Km/h, and so on.

In some embodiments, when the speed signal is less than the first speed threshold, the control module 1220 may generate the third access permission level. The third access permission level may direct the electric bicycle to turn on all functions for the service requester. The electric bicycle may be in "full use of the bicycle" state. In some embodiments, if the speed signal is greater than or equal to the first speed threshold, the control module 1220 may further determine a corresponding access permission level based on a pressure signal described in operations 630-640.

In 630, a pressure signal loaded on at least one part of the electric bicycle may be obtained. In some embodiments, operation 630 may be performed by the control module 1220 illustrated in FIG. 12. The pressure signal may be detected by a pressure sensor mounted on the seat of the electric bicycle. In some embodiments, the pressure signal may indicate a weight of the service requester.

The sensor array 141 may generate the pressure signal. In some embodiments, a pressure sensor of the sensor array 141 generates the pressure signal. The pressure sensor may be mounted on a seat, a wheel, a basket bottom, a pedal or a frame of the electric bicycle. The pressure sensor may be configured to detect the pressure loaded on the electric bicycle, and generate corresponding electrical signal indicative of the pressure. The pressure signal may be stored in a storage device (e.g., the storage device 150) of bicycle service system 100 via a communication port (e.g., the communication port 240).

In 640, the access permission level regarding the electric bicycle may be adjusted based on the pressure signal. In a certain embodiment, the control module 1220 may further determine whether the pressure signal is greater than or equal to a first pressure threshold and less than or equal to a third pressure threshold. If the pressure signal is greater than or equal to the first pressure threshold and less than or equal to the third pressure threshold, operation 650 may proceed. If the pressure signal is less than the first pressure threshold or greater than the third pressure threshold, operation 660 may proceed. In some embodiments, the first pressure threshold may be preset by the bicycle service system 100. The first pressure threshold may be adjusted in different scenarios. For example, the first pressure threshold may be 40 Kg, 43 Kg, 45 Kg, and so on. In some embodiments, the third pressure threshold may preset by the bicycle service system 100. The third pressure threshold may be adjusted in different scenarios. The third pressure threshold may be greater than the first pressure threshold. For example, the third pressure threshold may be 100 Kg, 103 Kg, 105 Kg, and so on.

In some embodiments, when the pressure signal is greater than or equal to the first pressure threshold and less than or equal to the third pressure threshold, the control module 1220 may continue to maintain the third access permission level of "full use of the bicycle". In some embodiments, when the pressure signal is less than the first pressure threshold or greater than the third pressure threshold, the control module 1220 may generate the second access permission level of "limited use of the bicycle", and adjust the current third access permission level to the permission level. The second access permission level may direct the electric bicycle to turn on a part of the bicycle's functions.

In 650, a current state of the electric bicycle may be maintained. In some embodiments, operation 650 may be performed by the control module 1220. For example, the electric bicycle maintains the state that the access permission level is "full use of the bicycle".

In some embodiments, when the service requester is riding the bicycle, the control module 1220 may further determine whether the service requester is suitable for the riding based on a current detected pressure signal. Specifically, when the speed of the electric bicycle reaches a specific threshold, the control module 1220 may determine that the service requester is in a normal riding condition. The control module 1220 may detect the current pressure signal loaded on the bicycle again. If the pressure verification is passed, that is, the current detected pressure signal is greater than or equal to the first pressure threshold and less than or equal to the third pressure threshold, the control module 1220 may maintain the current state of the electric bicycle (e.g., the state that the access permission level is "full use of the bicycle"). For example, the control module 1220 may determine the third access permission level if the pressure verification is passed. The third access permission level may indicate that the service requester can use all of the bicycle's functions. In other words, the control module 1220 may direct the electric bicycle to turn on all the functions for the service requester.

In 660, an electric motor of the electric bicycle may be turned off or the speed of the electric bicycle may be limited to a value less than a second speed threshold. In some embodiments, operation 660 may be performed by the control module 1220.

When the service requester is riding, the pressure signal loaded on the bicycle may be detected. If the detected pressure is less than the first pressure threshold, it is considered that the current service requester may be a child. If the detected pressure is greater than the third pressure threshold, it is considered that multiple people share the single electric bicycle. In these two cases, the control module 1220 may restrict the full use of the bicycle's functions. For example, the control module 1220 generates the second access permission level of the "limited use of the bicycle". The second access permission level may direct the electric bicycle to turn on a part of the functions for the service requester. The control module 1220 may limit the speed of the electric bicycle to be less than the second speed threshold, which may effectively reduce security risks. In some embodiments, the second speed threshold may be preset by the bicycle service system 100. The second speed threshold may be adjusted in different scenarios. The second speed threshold may be less than the first speed threshold. For example, the second speed threshold may be 3 Km/h, 5 Km/h, 10 Km/h, and so on.

In some embodiments, when the pressure signal is less than the first pressure threshold or greater than the third pressure threshold, the control module 1220 may determine the second access permission level that indicates the service requester only can use a part of the bicycle's functions, for example, upon occurrence of the second access permission level, the control module 1220 may reduce a power of the electric motor or turn off the electric motor so that the speed of the electric bicycle is limited to the value lower than the second speed threshold.

Figure 7:
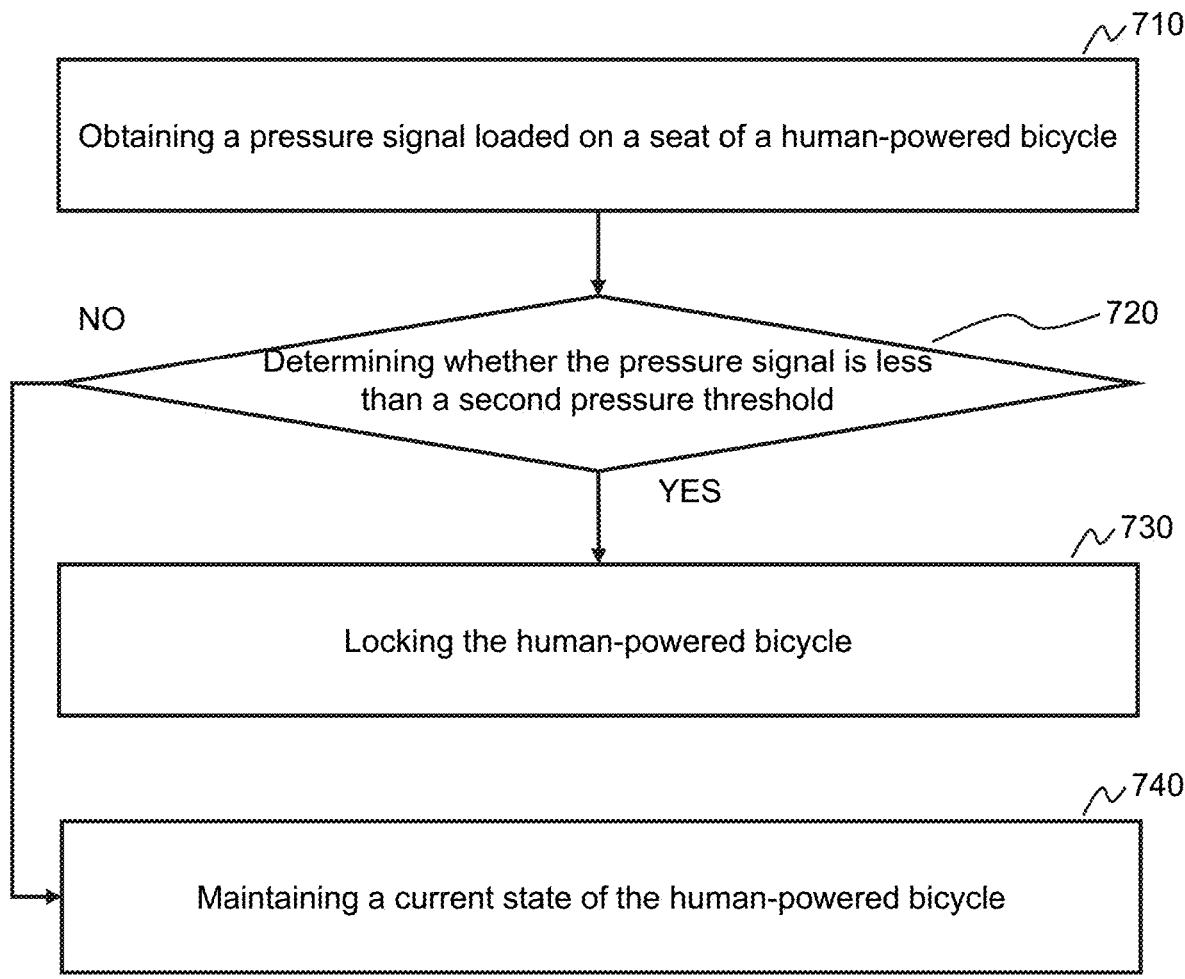
FIG. 7 is a flowchart illustrating an example process for controlling a human-powered bicycle according to some embodiments of the present disclosure.

FIG. 7 is a flowchart illustrating an example process for controlling a human-powered bicycle according to some embodiments of the present disclosure. In some embodiments, process 700 may be implemented in the bicycle service system 100. For example, the process 700 may be stored in the storage device 150 and/or the storage 220 in the form of instructions, and invoked and/or executed by the bicycle control device 110 (e.g., the processing device 112 of the bicycle control device 110, or the processor 210 of the computing device 200).

In 710, a pressure signal loaded on at least one part of the human-powered bicycle (e.g., the seat) may be obtained. In some embodiments, operation 510 may be performed by an obtaining module 1210 illustrated in FIG. 12. The bicycle service system 100 may determine whether the service requester gets off the seat according to the pressure signal loaded on at least one part of the human-powered bicycle (e.g., the seat).

The sensor array 141 may generate the pressure signal. In some embodiments, a pressure sensor of the sensor array 141 generates the pressure signal. The pressure sensor may be mounted on a seat, a wheel, a basket bottom, a pedal or a frame. The pressure sensor may be configured to detect the pressure loaded on the bicycle, and generate corresponding electrical signal indicative of the pressure. The pressure signal may be stored in a storage device (e.g., the storage device 150) of bicycle service system 100 via a communication port (e.g., the communication port 240).

In 720, whether the pressure signal is less than a second pressure threshold may be determined. Operation 720 may be performed by a control module 1220 illustrated in FIG. 12. If the pressure signal is less than the second pressure threshold, the control module 1220 may determining the access permission level of the "terminated use" that indicates the service requester finishes using the bicycle. Operation 730 may proceed. If the pressure signal is greater than or equal to the second pressure threshold, Operation 740 may proceed. In some embodiments, the second pressure threshold may be preset according to the bicycle service system 100. The second pressure threshold may be adjusted in different scenarios. The second pressure threshold may be less than the first pressure threshold. The second pressure threshold may be 5 Kg, 10 Kg, 15 Kg, and so on. In some embodiments, the second pressure threshold may be equal to the first pressure threshold.

In 730, the human-powered bicycle may be locked by a lock. In some embodiments, operation 730 may be performed by the control module 1220 illustrated in FIG. 12.

In some embodiments, when the pressure signal is less than the second pressure threshold, the control module 1220 may determine that the service requester gets off the bicycle. If the service requester forgets to lock the bicycle when he/she gets off the bicycle temporarily, which may cause economic losses to the service provider. Therefore, the human-powered bicycle may be locked actively based on the pressure signal, which may effectively avoid or reduce the issue above.

In 740, a current state of the human-powered bicycle may be maintained, and the returning of the bicycle may not be performed.

In some embodiments, when the pressure signal is greater than or equal to the second pressure threshold (in operation 520), it is considered that the service requester is riding the human-powered bicycle, therefore a normal turned-on condition of the bicycle need be maintained. For example, the electric bicycle maintains the state that the access permission level is "full use of the bicycle".

Figure 8:
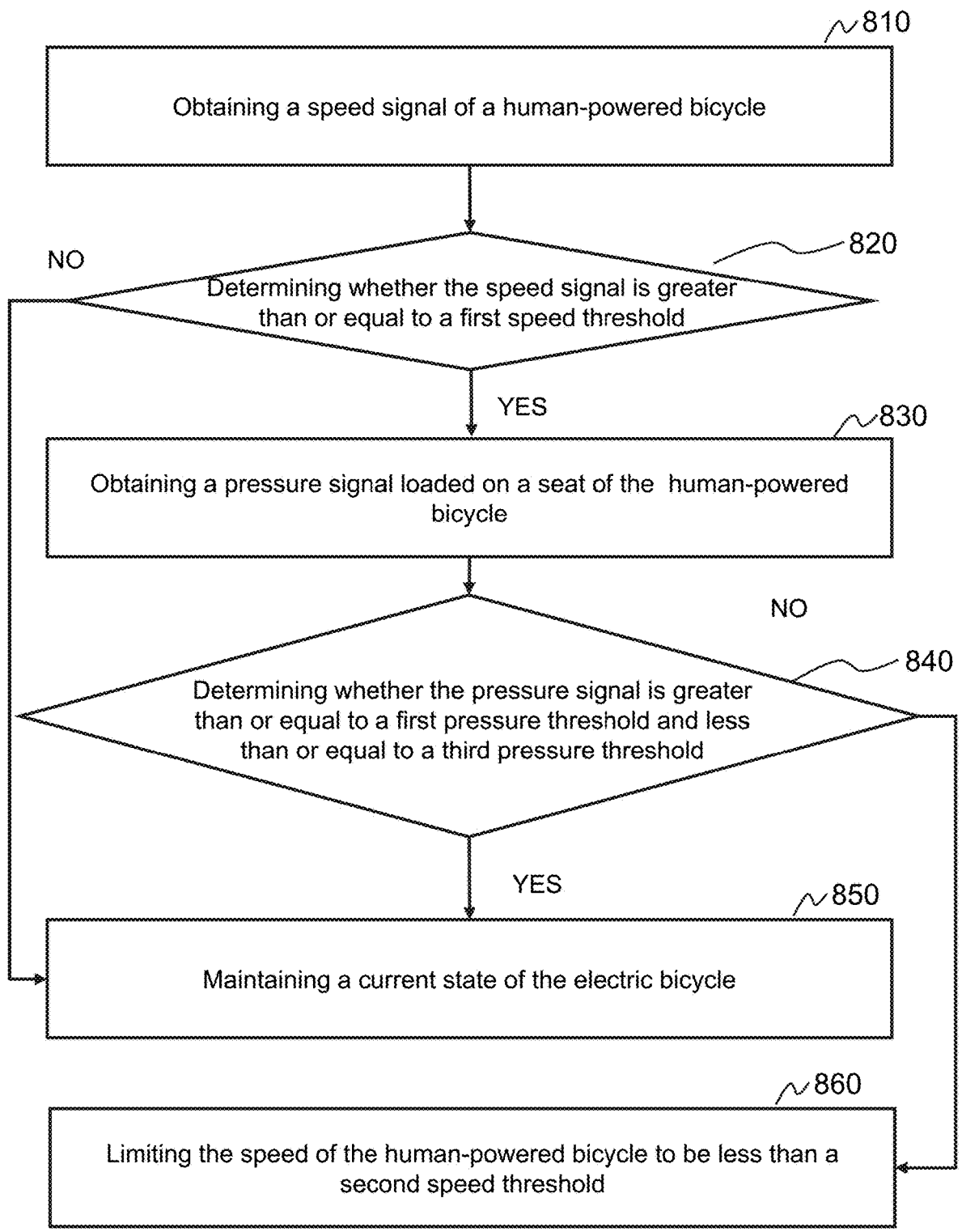
FIG. 8 is a flowchart illustrating an example process for controlling a human-powered bicycle according to some embodiments of the present disclosure.

FIG. 8 is a flowchart illustrating an example process for controlling a human-powered bicycle according to some embodiments of the present disclosure. In some embodiments, process 800 may be implemented in the bicycle service system 100. For example, the process 800 may be stored in the storage device 150 and/or the storage 220 in the form of instructions, and invoked and/or executed by the bicycle control device 110 (e.g., the processing device 112 of the bicycle control device 110, or the processor 210 of the computing device 200).

In 810, a speed signal of a human-powered bicycle may be obtained. In some embodiments, operation 810 may be performed by a control module 1220 illustrated in FIG. 12.

The sensor array 141 may generate the speed signal. In some embodiments, a speed sensor of the sensor array 141 may generate the speed signal. The speed sensor may detect the speed of the bicycle, and generate a corresponding electrical signal. The electrical signal may be output to the microprocessor of the bicycle for further processing. The speed sensor may include but is not limited to a magneto-electric speed sensor, a Hall type speed sensor, a photoelectric sensor, or the like, or any combination thereof. In some embodiments, the speed may be determined based on the position information and time information regarding the bicycle. The speed signal may be stored in a storage device (e.g., the storage device 150) of the bicycle service system 100 through a communication port (e.g., the communication port 240).

In 820, an access permission level regarding the human-powered bicycle may be determined based on the speed signal. Operation 820 may be performed by the control module 1220. The access permission level may include a first access permission level (i.e., "no use of the bicycle") indicating that the service requester can't use the bicycle, a second access permission level (i.e., "limited use of the bicycle") indicating that the service requester can use a part of the bicycle's functions, a third access permission level (i.e., "full use of the bicycle") indicating that the service requester can use all of the bicycle's functions, a fourth access permission level (i.e., "terminated use") indicating that the service requester finishes using the bicycle.

In a certain embodiment, in 820, the control module 1220 may be determine whether the speed signal is greater than or equal to a first speed threshold. If the speed signal is greater than or equal to the first speed threshold, operation 830 may proceed. If the speed signal is less than the first speed threshold, operation 850 may proceed. In some embodiments, the first speed threshold may preset according to the bicycle service system 100. The first speed threshold may be adjusted in different scenarios. For example, the first speed threshold may be 3 Km/h, 5 Km/h, 8 Km/h, and so on.

In some embodiments, when the speed signal is less the first speed threshold, the control module 1220 may generate the third access permission level of. The third access permission level may direct the bicycle to turn on all functions for the service requester. The bicycle may be in "full use of the bicycle" state. In some embodiments, if the speed signal is greater than or equal to the first speed threshold, the control module 1220 may further determine a corresponding access permission level based on a pressure signal described in operations 830-840.

In 830, a pressure signal loaded on at least one part of the human-powered bicycle may be obtained. In some embodiments, operation 830 may be performed by the control module 1220. The pressure signal may be detected by a pressure sensor mounted on the seat of the bicycle. In some embodiments, the pressure signal may indicate a weight of the service requester.

The sensor array 141 may generate the pressure signal. In some embodiments, a pressure sensor of the sensor array 141 generates the pressure signal. The pressure sensor may be mounted on a seat, a wheel, a basket bottom, a pedal or a frame. The pressure sensor may be configured to detect the pressure loaded on the bicycle, and generate corresponding electrical signal indicative of the pressure. The pressure signal may be stored in a storage device (e.g., the storage device 150) of bicycle service system 100 via a communication port (e.g., the communication port 240).

In 840, the corresponding access permission level regarding the human-powered bicycle may be adjusted based on the pressure signal. In a certain embodiment, the control module 1220 may further determine whether the pressure signal is greater than or equal to a first pressure threshold and less than or equal to a third pressure threshold. If the pressure signal is greater than or equal to the first pressure threshold and less than or equal to the third pressure threshold, operation 850 may proceed. If the pressure signal is less than the first pressure threshold or greater than the third pressure threshold, operation 860 may proceed. In some embodiments, the first pressure threshold may be preset by the bicycle service system 100. The first pressure threshold may be adjusted in different scenarios. For example, the first pressure threshold may be 40 Kg, 43 Kg, 45 Kg, and so on. In some embodiments, the third pressure threshold may preset by the bicycle service system 100. The third pressure threshold may be adjusted in different scenarios. The third pressure threshold may be greater than the first pressure threshold. For example, the third pressure threshold may be 100 Kg, 103 Kg, 105 Kg, and so on.

In some embodiments, when the pressure signal is greater than or equal to the first pressure threshold and less than or equal to the third pressure threshold, the control module 1220 may continue to maintain the third access permission level of "full use of the bicycle". In some embodiments, when the pressure signal is less than the first pressure threshold or greater than the third pressure threshold, the control module 1220 may generate the second access permission level of "limited use of the bicycle", and adjust the current third access permission level to the second permission level. The second access permission level may direct the bicycle to turn on a part of the bicycle's functions.

In 850, a current state of the human-powered bicycle may be maintained. In some embodiments, operation 850 may be performed by the control module 1220. For example, the human-powered bicycle maintains the state that the access permission level is "full use of the bicycle".

In some embodiments, when the service requester is riding the bicycle, the control module 1220 may further determine whether the service requester is suitable for the riding based on a current detected pressure signal. Specifically, when the speed of the bicycle reaches a specific threshold, the control module 1220 may determine that the service requester is in a normal riding condition. The control module 1220 may detect the current the pressure signal loaded on the bicycle again. If the pressure verification is passed, that is, the current detected pressure signal is greater than or equal to the first pressure threshold and less than or equal to the third pressure threshold, the control module 1220 may maintain the current state of the human-powered bicycle (e.g., the human-powered bicycle turns on all functions for the service requester). For example, the control module 1220 may determine the third access permission level if the pressure verification is passed. The third access permission level may indicate that the service requester can use all of the bicycle's functions. In other words, the control module 1220 may direct the human-powered bicycle to turn on all the functions for the service requester.

In 860, the speed of the human-powered bicycle may be limited to a value less than a second speed threshold. In some embodiments, operation 860 may be performed by the control module 1220.

When the service requester is riding, the pressure signal loaded on the bicycle may be detected. If the detected pressure is less than the first pressure threshold, it is considered that the current service requester may be a child. If the detected pressure is greater than the third pressure threshold, it is considered that multiple people share the single bicycle. In these two cases, the control module 1220 may restrict the full use of the bicycle's functions. For example, the control module 1220 generate the second access permission level of the "limited use of the bicycle". The second access permission level may direct the bicycle to turn on a part of the functions for the service requester. The control module 1220 may limit the speed of the human-powered bicycle to be less than the second speed threshold, which may effectively reduce security risks. In some embodiments, the second speed threshold may be preset by the bicycle service system 100. The second speed threshold may be adjusted in different scenarios. The second speed threshold may be less than the first speed threshold. For example, the second speed threshold may be 1 Km/h, 2 Km/h, 3 Km/h, and so on.

In some embodiments, when the pressure signal is less than the first pressure threshold or greater than the third pressure threshold, the control module 1220 may control the braking device of the bicycle to limit the speed of the bicycle to be less than the second speed threshold.

Figure 9:
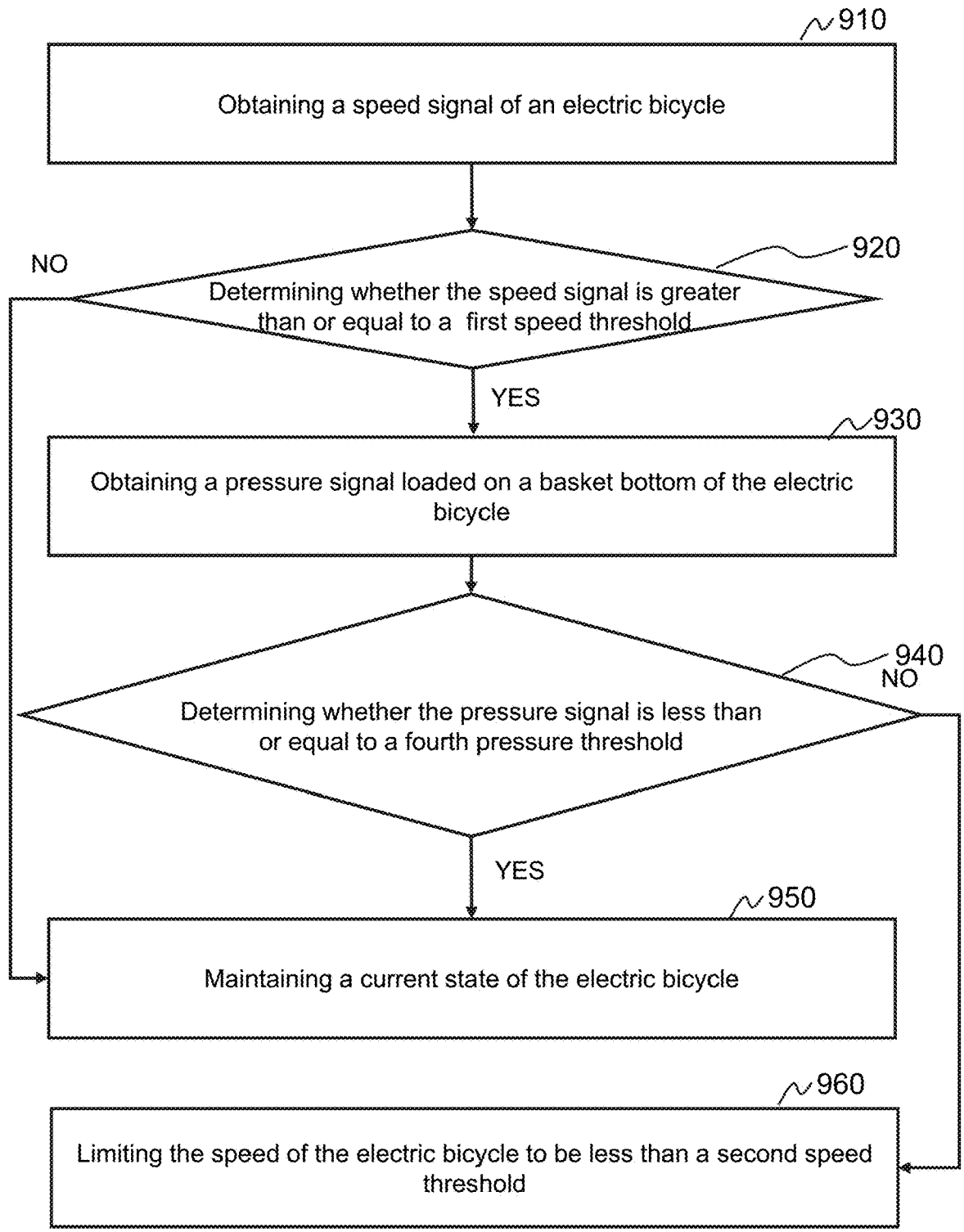
FIG. 9 is a flowchart illustrating an example process for controlling an electric bicycle according to some embodiments of the present disclosure.

FIG. 9 is a flowchart illustrating an example process for controlling an electric bicycle according to some embodiments of the present disclosure. In some embodiments, process 900 may be implemented in the bicycle service system 100. For example, the process 900 may be stored in the storage device 150 and/or the storage 220 in the form of instructions, and invoked and/or executed by the bicycle control device 110 (e.g., the processing device 112 of the bicycle control device 110, or the processor 210 of the computing device 200).

In 910, a speed signal of an electric bicycle may be obtained. In some embodiments, operation 910 may be performed by a control module 1220 illustrated in FIG. 12.

The sensor array 141 may generate the speed signal. In some embodiments, a speed sensor of the sensor array 141 may generate the speed signal. The speed sensor may detect the speed of the bicycle, and generate a corresponding electrical signal. The electrical signal may be output to the microprocessor of the bicycle for further processing. The speed sensor may include but is not limited to a magneto-electric speed sensor, a Hall type speed sensor, a photoelectric sensor, or the like, or any combination thereof. In some embodiments, the speed may be determined based on the position information and time information regarding the bicycle. The speed signal may be stored in a storage device (e.g., the storage device 150) of the bicycle service system 100 through a communication port (e.g., the communication port 240).

In 920, an access permission level regarding the electric bicycle may be determined based on the speed signal. Operation 920 may be performed by the control module

Figure 12:
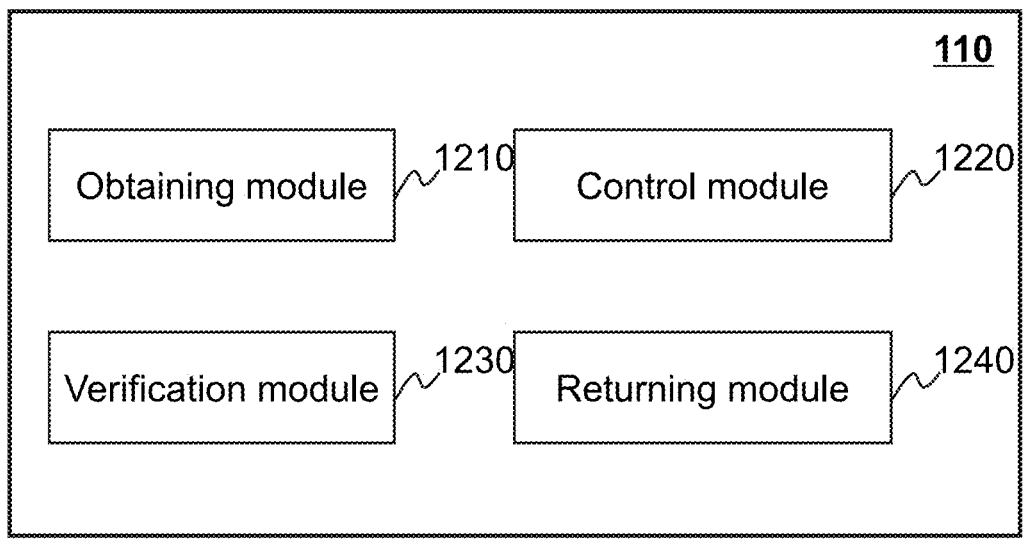
FIG. 12 is a schematic diagram illustrating exemplary components of a bicycle control device.

1220 illustrated in FIG. 12. The access permission level may include a first access permission level (i.e., "no use of the bicycle") indicating that the service requester can't use the bicycle, a second access permission level (i.e., "limited use of the bicycle") indicating that the service requester can use a part of the bicycle's functions, a third access permission level (i.e., "full use of the bicycle") indicating that the service requester can use all of the bicycle's functions, a fourth access permission level (i.e., "terminated use") indicating that the service requester finishes using the bicycle.

In a certain embodiment, in 920, the control module 1220 may determine whether the speed signal is greater than or equal to a first speed threshold. If the speed signal is greater than or equal to the first speed threshold, operation 930 may proceed. If the speed signal is less than the first speed threshold, operation 950 may proceed. In some embodiments, the first speed threshold may preset according to the bicycle service system 100. The first speed threshold may be adjusted in different scenarios. For example, the first speed threshold may be 20 Km/h, 25 Km/h, 30 Km/h, and so on.

In some embodiments, when the speed signal is less than the first speed threshold, the control module 1220 may generate the third access permission level. The third access permission level may direct the electric bicycle to turn on all functions for the service requester. The electric bicycle may be in "full use of the bicycle" state. In some embodiments, if the speed signal is greater than or equal to the first speed threshold, the control module 1220 may further determine a corresponding access permission level based on a pressure signal described in operations 930-940.

In 930, a pressure signal loaded on at least one part of the electric bicycle may be obtained. In some embodiments, operation 930 may be performed by the control module 1220 illustrated in FIG. 12. The pressure signal may be detected by a pressure sensor mounted on the basket bottom of the electric bicycle. In some embodiments, the pressure signal may indicate a weight of article(s) placed in the basket.

The sensor array 141 may generate the pressure signal. In some embodiments, a pressure sensor of the sensor array 141 generates the pressure signal. The pressure sensor may be mounted on a seat, a wheel, a basket bottom, a pedal or a frame. The pressure sensor may be configured to detect the pressure loaded on the electric bicycle, and generate corresponding electrical signal indicative of the pressure. The pressure signal may be stored in a storage device (e.g., the storage device 150) of bicycle service system 100 via a communication port (e.g., the communication port 240).

In 940, the corresponding access permission level regarding the electric bicycle may be adjusted based on the pressure signal. In a certain embodiment, the control module 1220 may further determine whether the pressure signal is less than or equal to a fourth pressure threshold. If the pressure signal is less than or equal to the fourth pressure threshold, operation 950 may proceed. If the pressure signal is greater than the fourth pressure threshold, operation 960 may proceed. In some embodiments, the fourth pressure threshold may be preset by the bicycle service system 100. The fourth pressure threshold may be adjusted in different scenarios. For example, the fourth pressure threshold may be 10 Kg, 15 Kg, 20 Kg, and so on.

In some embodiments, when the pressure signal is less than or equal to the fourth pressure threshold, the control module 1220 may continue to maintain the third access permission level of "full use of the bicycle". In some embodiments, when the pressure signal is greater than the fourth pressure threshold, the control module 1220 may generate the second access permission level, and adjust the current third access permission level to the second access permission level. The second access permission level may direct the electric bicycle to turn on a part of the bicycle's functions.

In 950, a current state of the electric bicycle may be maintained. In some embodiments, operation 950 may be performed by the control module 1220 illustrated in FIG. 12. For example, the electric bicycle maintains the state that the access permission level is "full use of the bicycle".

In some embodiments, when the service requester is riding the bicycle, the control module 1220 may further determine whether the service requester is suitable for the riding based on a current detected pressure signal. Specifically, when the speed of the electric bicycle reaches a specific threshold, the control module 1220 may determine that the service requester is in a normal riding condition. The control module 1220 may detect the current the pressure signal loaded on the bicycle again. If the pressure verification is passed, that is, the current detected pressure signal is less than or equal to the fourth pressure threshold, the control module 1220 may maintain the current state of the electric bicycle (e.g., the electric bicycle turns on all functions for the service requester). For example, the control module 1220 may determine the third access permission level if the pressure verification is passed. The third access permission level may indicate that the service requester can use all of the bicycle's functions. In other words, the control module 1220 may direct the electric bicycle to turn on all the functions for the service requester.

In 960, the speed of the electric bicycle may be limited to a value less than a second speed threshold. In some embodiments, operation 960 may be performed by the control module 1220 illustrated in FIG. 12.

When the service requester is riding, the pressure signal loaded on the bicycle may be detected. If the detected pressure regarding the article(s) in the basket is greater than the fourth pressure threshold, it is considered that the article(s) in the basket may be overload. In the case, the control module 1220 may restrict the full use of the bicycle's functions. For example, the control module 1220 generate the second access permission level of the "limited use of the bicycle". The second access permission level may direct the electric bicycle to turn on a part of the functions for the service requester. The control module 1220 may limit the speed of the electric bicycle to be less than the second speed threshold, which may effectively reduce security risks. In some embodiments, the second speed threshold may be preset by the bicycle service system 100. The second speed threshold may be adjusted in different scenarios. The second speed threshold may be less than the first speed threshold. For example, the second speed threshold may be 3 Km/h, 5 Km/h, 10 Km/h, and so on.

In some embodiments, when the pressure signal is greater than the fourth pressure threshold, the control module 1220 may determine the second access permission level that indicates the service requester only can use a part of the bicycle's functions, for example, upon occurrence of the second access permission level, the control module 1220 may reduce a power of the electric motor or turn off the electric motor so that the speed of the electric bicycle is limited to the value lower than the second speed threshold.

Figure 10:
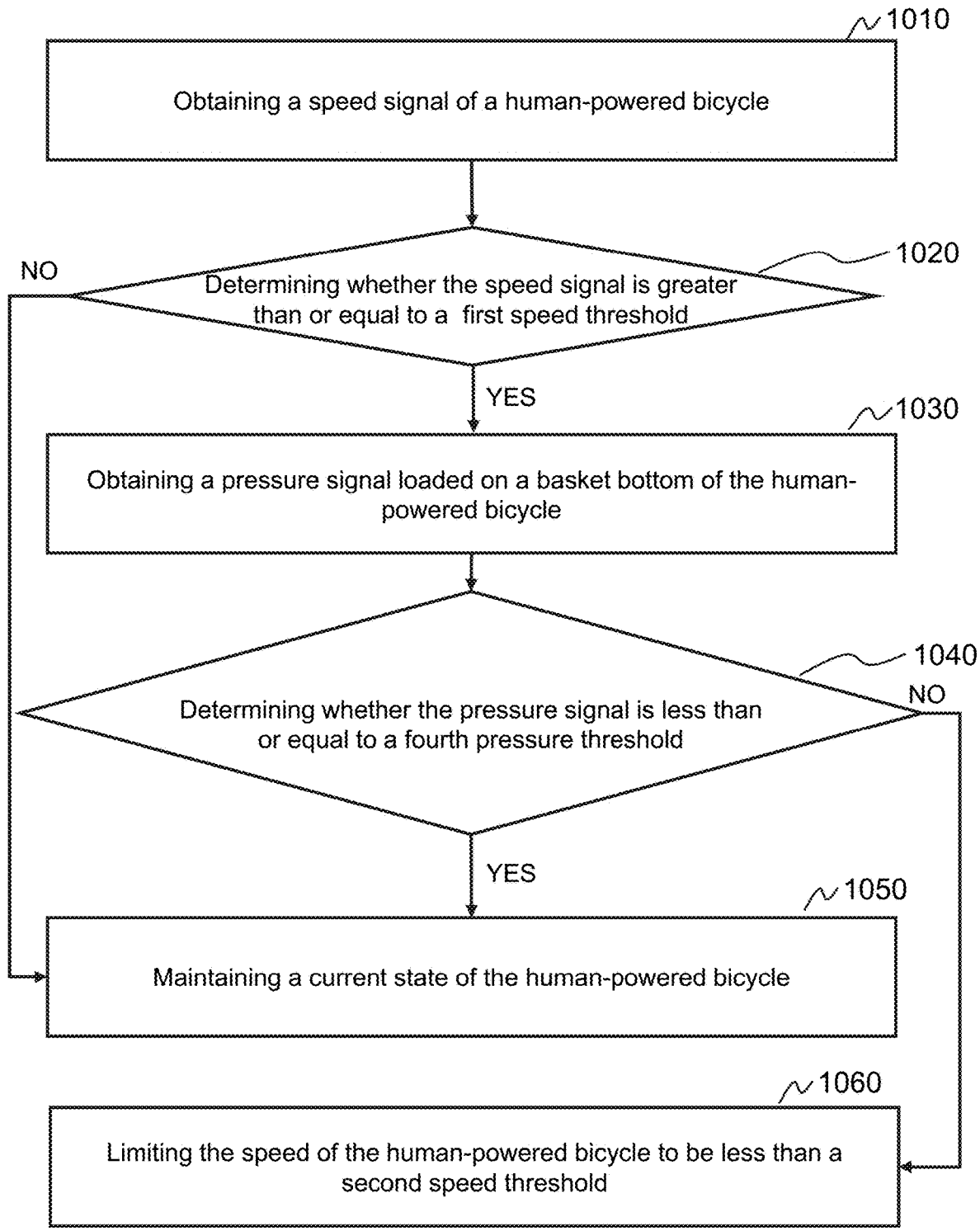
FIG. 10 is a flowchart illustrating an example process for controlling a human-powered bicycle according to some embodiments of the present disclosure.

FIG. 10 is a flowchart illustrating an example process for controlling a human-powered bicycle according to some embodiments of the present disclosure. In some embodiments, process 1000 may be implemented in the bicycle service system 100. For example, the process 1000 may be stored in the storage device 150 and/or the storage 220 in the form of instructions, and invoked and/or executed by the bicycle control device 110 (e.g., the processing device 112 of the bicycle control device 110, or the processor 210 of the computing device 200).

In 1010, a speed signal of a human-powered bicycle may be obtained. In some embodiments, operation 810 may be performed by a control module 1220 illustrated in FIG. 12.

The sensor array 141 may generate the speed signal. In some embodiments, a speed sensor of the sensor array 141 may generate the speed signal. The speed sensor may detect the speed of the bicycle, and generate a corresponding electrical signal. The electrical signal may be output to the microprocessor of the bicycle for further processing. The speed sensor may include but is not limited to a magneto-electric speed sensor, a Hall type speed sensor, a photoelectric sensor, or the like, or any combination thereof. In some embodiments, the speed may be determined based on the position information and time information regarding the bicycle. The speed signal may be stored in a storage device (e.g., the storage device 150) of the bicycle service system 100 through a communication port (e.g., the communication port 240).

In 1020, an access permission level regarding the human-powered bicycle may be determined based on the speed signal. Operation 1020 may be performed by the control module 1220 illustrated in FIG. 12. The access permission level may include a first access permission level (i.e., "no use of the bicycle") indicating that the service requester can't use the bicycle, a second access permission level (i.e., "limited use of the bicycle") indicating that the service requester can use a part of the bicycle's functions, a third access permission level (i.e., "full use of the bicycle") indicating that the service requester can use all of the bicycle's functions, a fourth access permission level (i.e., "terminated use") indicating that the service requester finishes using the bicycle.

In a certain embodiment, in 1020, the control module 1220 may determine whether the speed signal is greater than or equal to a first speed threshold. If the speed signal is greater than or equal to the first speed threshold, operation 1030 may proceed. If the speed signal is less than the first speed threshold, operation 1050 may proceed. In some embodiments, the first speed threshold may preset according to the bicycle service system 100. The first speed threshold may be adjusted in different scenarios. For example, the first speed threshold may be 3 Km/h, 5 Km/h, 8 Km/h, and so on.

In some embodiments, when the speed signal is less the first speed threshold, the control module 1220 may generate the third access permission level. The third access permission level may direct the bicycle to turn on all functions for the service requester. The bicycle may be in "full use of the bicycle" state. In some embodiments, if the speed signal is greater than or equal to the first speed threshold, the control module 1220 may further determine a corresponding access permission level based on a pressure signal described in operations 1030-1040.

In 1030, a pressure signal loaded on at least one part of the human-powered bicycle may be obtained. In some embodiments, operation 1030 may be performed by the control module 1220. The pressure signal may be detected by a pressure sensor mounted on the basket bottom of the human-powered bicycle. In some embodiments, the pressure signal may indicate a weight of article(s) placed in the basket.

The sensor array 141 may generate the pressure signal. In some embodiments, a pressure sensor of the sensor array 141 generates the pressure signal. The pressure sensor may be mounted on a seat, a wheel, a basket bottom, a pedal or a frame. The pressure sensor may be configured to detect the pressure loaded on the bicycle, and generate corresponding electrical signal indicative of the pressure. The pressure signal may be stored in a storage device (e.g., the storage device 150) of bicycle service system 100 via a communication port (e.g., the communication port 240).

In 1040, the corresponding access permission level regarding the human-powered bicycle may be adjusted based on the pressure signal. In a certain embodiment, the control module 1220 may further determine whether the pressure signal is less than or equal to a fourth pressure threshold. If the pressure signal is less than or equal to the fourth pressure threshold, operation 1050 may proceed. If the pressure signal is greater than the fourth pressure threshold, operation 1060 may proceed. In some embodiments, the fourth pressure threshold may be preset by the bicycle service system 100. The fourth pressure threshold may be adjusted in different scenarios. For example, the fourth pressure threshold may be 10 Kg, 15 Kg, 20 Kg, and so on.

In some embodiments, when the pressure signal is less than or equal to the fourth pressure threshold, the control module 1220 may continue to maintain the third access permission level of "full use of the bicycle". In some embodiments, when the pressure signal is greater than the fourth pressure threshold, the control module 1220 may generate the second access permission level, and adjust the current third access permission level to the second authority. The second access permission level may direct the electric bicycle to turn on a part of the bicycle's functions.

In 1050, a current state of the human-powered bicycle may be maintained. In some embodiments, operation 850 may be performed by the control module 1220 illustrated in FIG. 12. For example, the human-powered bicycle maintains the state that the access permission level is "full use of the bicycle"

In some embodiments, when the service requester is riding the bicycle, the control module 1220 may further determine whether the service requester is suitable for the riding based on a current detected pressure signal. Specifically, when the speed of the bicycle reaches a specific threshold (e.g., the first speed threshold), the control module 1220 may determine that the service requester is in a normal riding condition. The control module 1220 may detect the current the pressure signal loaded on the bicycle again. If the pressure verification is passed, that is, the current detected pressure signal is less than or equal to the fourth pressure threshold, the control module 1220 may maintain the current state of the electric bicycle (e.g., the electric bicycle turns on all functions for the service requester). For example, the control module 1220 may determine the third access permission level if the pressure verification is passed. The third access permission level may indicate that the service requester can use all of the bicycle's functions. In other words, the control module 1220 may direct the electric bicycle to turn on all the functions for the service requester.

In 1060, the speed of the human-powered bicycle may be limited to a value less than a second speed threshold. In some embodiments, operation 1060 may be performed by the control module 1220 illustrated in FIG. 12.

When the service requester is riding, the pressure signal loaded on the bicycle may be detected. If the detected pressure regarding the article(s) in the basket is greater than the fourth pressure threshold, it is considered that the basket may be overload. In the case, the control module 1220 may restrict the full use of the bicycle's functions. For example, the control module 1220 generate the second access permission level of the "limited use of the bicycle". The second access permission level may direct the bicycle to turn on a part of the functions for the service requester. The control module 1220 may limit the speed of the bicycle to be less than the second speed threshold, which may effectively reduce safety risks. In some embodiments, the second speed threshold may be preset by the bicycle service system 100. The second speed threshold may be adjusted in different scenarios. The second speed threshold may be less than the first speed threshold. For example, the second speed threshold may be 1 Km/h, 2 Km/h, 3 Km/h, and so on.

In some embodiments, when the pressure signal is greater than the fourth pressure threshold, the control module 1220 may control the braking device of the bicycle to limit the speed of the bicycle to be less than the second speed threshold.

In some embodiments, the sensor array 141 may detect other signals for controlling the electric motor of an electric bicycle. The sensor array 141 may include but not limited to an acceleration sensor, a pressure sensor, a speed sensor, a gyroscope, or the like, or any combination thereof.

For example, the control module 1220 may determine whether the electric bicycle is going uphill or downhill by using the gyroscope, and further adjust the power of the electric motor of the electric bicycle according to the uphill or downhill. In some embodiments, when the electric bicycle is going uphill, if the power of electric motor is not big enough, a rotation speed of the electric motor would be small, which may cause a large amount of electric energy to be transformed to heat energy. In this case, it is inefficient and easy to damage electric components of the processor (e.g., a MOS tube). When the electric bicycle is going downhill, if the power of the electric motor is not reduced, the speed of the electric bicycle would continue to increase, which may cause safety risks due to a potential violent braking operation.

In some embodiments, the control module 1220 may determine whether the electric bicycle is going uphill or downhill by using the gyroscope. Specifically, the control module 1220 may obtain output signal of the gyroscope. The control module 1220 may determine an attitude angle of the electric bicycle based on the output signal of the gyroscope. The attitude angle may include a pitch angle, a yaw angle, and/or a roll angle. The control module 1220 may further determine whether the electric bicycle is going uphill or downhill based on the pitch angle.

In some embodiments, the pitch angle refers to an angle between the electric bicycle and the sea level. When the electric bicycle is above sea level, the pitch angle may be a positive angle. When the electric bicycle is below the sea level, the pitch angle may be a negative angle. Therefore, when the pitch angle is positive, the control module 1220 may determine that the electric bicycle is going uphill. When the pitch angle is negative, the control module 1220 may determine that the electric bicycle is going downhill. When the electric bicycle is going uphill, the control module 1220 may increase the power of the electric motor. When the electric bicycle is going downhill, the control module 1220 may reduce the power of the electric motor.

Figure 11:
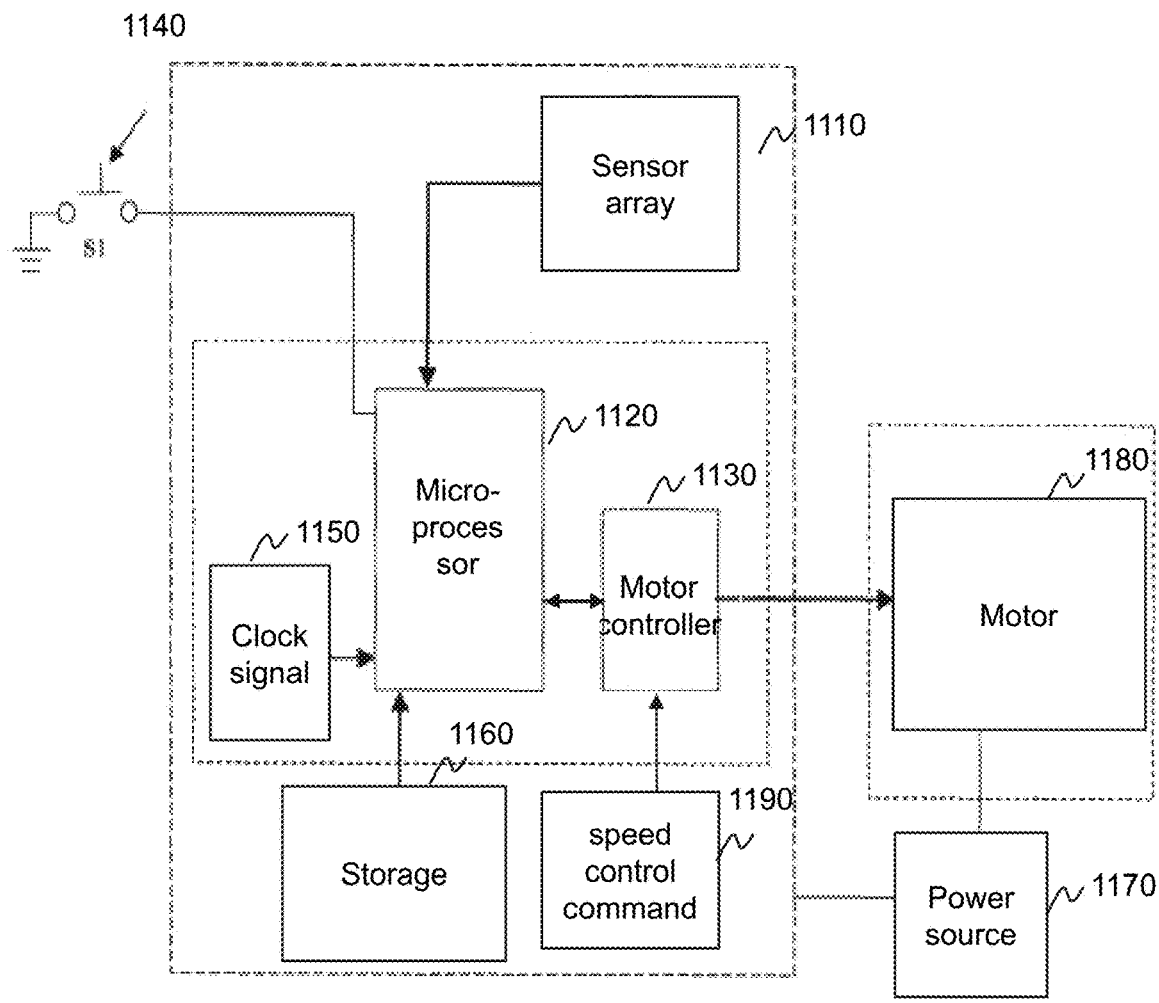
FIG. 11 is a schematic diagram illustrating exemplary components of an electric bicycle.

FIG. 11 is a schematic diagram illustrating exemplary components of an electric bicycle. As shown in FIG. 11, the electric bicycle may include a sensor array 1110, a microprocessor 1120, a storage device 1160, a power source 1170, and a motor 1180.

The sensor array 1110 may include but not limited to a pressure sensor and a motion sensor. The pressure sensor may be mounted on a seat, a wheel, a basket, a pedal, or a frame. The pressure sensor is configured to detect the pressure load on the bicycle, and generate electrical signals indicative of the pressure load. The motion sensor may connect to the microprocessor 1120. The motion sensor is configured to obtain motion signals of the electric bicycle, and generate electrical signals indicative of the motion signals. The motion signals include but not limited to speed signals, acceleration signals, attitude angle signals, or the like, or any combination thereof. In some embodiments, the motion sensor includes at least one of a gravity sensor, an acceleration sensor, a speed sensor, or a gyroscope. The gravity sensor is configured to detect the gravitational acceleration of the electric bicycle, and generate the electrical signals indicative of the gravitational acceleration. The acceleration sensor is configured to detect the acceleration of the electric bicycle, and generate the electrical signals indicative of the acceleration. The acceleration may be represented in three dimensions (e.g., x-axis, y-axis, z-axis). The speed sensor is configured to detect the speed of the electric bicycle, and generate the electrical signals indicative of the speed. The gyroscope is configured to detect the motion attitude of the electric bicycle, and generate the electrical signals indicative of the motion attitude.

The electrical signals generated by the sensor array 1110 may be transmitted to the microprocessor 1120. The microprocessor 1120 may generate a control signal for the motor 1180 based on the electrical signals. The microprocessor 1120 may connect to a motor controller 1130, a reset button 1140, and a clock signal 1150. In some embodiments, the microprocessor 1120 may include a Digital Signal Processor (DSP). The microprocessor 1120 (e.g., the DSP) may receive a clock signal from the clock signal 1150. The microprocessor 1120 may run control program instructions of the electric bicycle based on the clock signal, and generate an access permission level by analyzing the electrical signals from the sensor array 1110. The control program instructions may be stored in the storage device 1160. The motor controller 1130 may generate an analog signal (e.g., a voltage, a current) for controlling the electric motor based on the access permission level and a speed control command 1190. The motor controller 1130 may detect the speed control command 1190. The speed control command 1190 may be generated based on a user's driving or riding operation. For example, when the service requester turns a handlebar of the bicycle, the speed control command 1190 (e.g., an acceleration command, or a deceleration command) may be generated accordingly. In some embodiments, when the access permission level indicating that the service requester only can use a part of the bicycle's functions (i.e., "limited use of the bicycle") is generated, if the service requester desires to accelerate the bicycle by operating the handlebar, in this case, a corresponding acceleration command may be generated indicative of invalidity of acceleration. While the motor controller 1130 may determine that the generated acceleration command is disable due to the access permission level of "limited use of the bicycle", and do not increase the power of the electric bicycle to accelerate the bicycle.

FIG. 12 is a schematic diagram illustrating exemplary components of a bicycle control device 110. As shown in FIG. 12, the bicycle control device 110 may include an obtaining module 1210, a control module 1220, a verification module 1230, and a returning module 1240. The modules may be hardware circuits of at least part of the processing device 112. The modules may also be implemented as an application or set of instructions read and executed by the processing device 112. Further, the modules may be any combination of the hardware circuits and the application/ instructions. For example, the modules may be the part of the processing device 112 when the processing device 112 is executing the application/set of instructions.

The obtaining module 1210 may be configured to obtain a pressure signal from at least one part of the bicycle. The sensor array 141 may generate the pressure signal. In some embodiments, a pressure sensor of the sensor array 141 generates the pressure signal. The pressure sensor may be mounted on a seat, a wheel, a basket bottom, a pedal or a frame. The pressure sensor may be configured to detect the pressure loaded on the electric bicycle, and generate corresponding electrical signal indicative of the pressure. The pressure signal may be stored in a storage device (e.g., the storage device 150) of bicycle service system 100 via a communication port (e.g., the communication port 240).

The control module 1220 may be configured to control at least one electric control component of the bicycle based on the pressure signal. In some embodiments, the control module 1220 may obtain a pressure signal, a motion signal (e.g., a speed signal), or the like, or any combination thereof. In some embodiments, the control module 1220 may determine a relationship of the pressure signal and a preset threshold. In some embodiments, the control module 1220 may control the at least one electric control component of the bicycle based on the motion signal and the pressure signal. In some embodiments, the control module 1220 may unlock the bicycle when user information of a service requester is identified as legitimate. In some embodiments, the control module 1220 may determine a condition of the bicycle based on the motion signal.

The verification module 1230 may be configured to verify the user information of the service requester. The verification module 1230 may include a user information obtaining sub-module, a user information verification sub-module, and a control sub-module. The user information obtaining sub-module may be configured to obtain user information of the service requester. The user information verification sub-module may be configured to determine whether the user information is legitimate. The control sub-module may be configured to unlock the bicycle when the user information is identified as legitimate.

The returning module 1240 may be configured to determine whether to return the bicycle successfully based on the pressure signal. In some embodiments, the returning module 1240 may obtain position information of the bicycle. The returning module 1240 may determine whether to return the bicycle successfully based on the position information. Specifically, the returning module 1240 may determine, based on the position information, whether the bicycle locates at a first location. When the bicycle locates at the first location, the bicycle is returned successfully. When the bicycle does not locate at the first location, the bicycle return failed. In some embodiments, the returning module 1240 may transmit information indicative of a successful returning of the bicycle to the server via a wireless communication module when the pressure signal is less than a second pressure threshold.

It should be noted that each of the above modules may include a software module implemented by computer program instructions. The bicycle control device 110 may further include control program instructions for controlling the bicycle. When the instructions are executed, the bicycle control device 110 may execute a method or process disclosed in the present disclosure. The control program instructions may be stored in a computer readable storage medium in the form of computer instructions.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A method for controlling a bicycle used in an online to offline (O2O) service platform that provides a sharing service of bicycles, the method being implemented on a computing device having at least one processor and at least one computer-readable storage medium, the method comprising:
    detecting a pressure signal from at least one part of the bicycle;
    determining an access permission level based at least on the pressure signal;
    controlling at least one electric control component of the bicycle according to at least an access permission level,
    wherein before the detecting the pressure signal from at least one part of the object, the method further comprises:
        obtaining user information of a service requester;
        determining whether the user information is legitimate; and
        unlocking the bicycle in response to that the user information is legitimate.

2. The method of claim 1, wherein at least one part of the bicycle is a seat of the bicycle, and the controlling at least one electric control component of the bicycle includes:
    determining whether a pressure signal is greater than or equal to a first pressure threshold;
    determining the access permission level to be full use of the bicycle in response to a determination that the pressure signal is greater than or equal to the first pressure threshold; and
    turning on an electric motor of the bicycle according to the access permission level of the full use of the bicycle.

3. A system for controlling a bicycle used in an online to offline (O2O) service platform that provides a sharing service of bicycles, comprising:
    at least one storage device including one or more sets of instructions; and
    at least one processor in communication with the at least one storage device, wherein when executing the one or more sets of instructions, the at least one processor is configured to cause the system to:
    detect a pressure signal from at least one part of the bicycle;
    determine an access permission level based at least on the pressure signal; and
    control at least one electric control component of the bicycle according to at least an access permission level,
    wherein before the detecting the pressure signal from at least one part of the object, the method further comprises:
        obtain user information of a service requester;
        determine whether the user information is legitimate; and
        unlock the bicycle in response to that the user information is legitimate.

4. The system of claim 3, wherein the access permission level is:
    no use of the bicycle;
    limited use of the bicycle;
    full use of the bicycle; or
    terminated use.

5. The system of claim 4, wherein the bicycle includes a seat, a pedal, or a basket.

6. The system of claim 5, wherein the at least one electric control component includes a lock, a braking device, or an electric motor.

7. The system of claim 6, wherein at least one part of the bicycle is the seat of the bicycle, and to control at least one electric control component of the bicycle, the at least one processor is configured to cause the system to:
    determine whether a pressure signal is greater than or equal to a first pressure threshold;
    determine the access permission level to be the full use of the bicycle in response to a determination that the pressure signal is greater than or equal to the first pressure threshold; and
    turn on the electric motor of the bicycle according to the access permission level of the full use of the bicycle.

8. The system of claim 6, wherein at least one part of the bicycle is the seat of the bicycle, and to control at least one electric control component of the bicycle, the at least one processor is configured to cause the system to:
    determine whether a pressure signal is greater than or equal to a first pressure threshold and less than or equal to a third pressure threshold, wherein the third pressure threshold is greater than the first pressure threshold;
    determine the access permission level to be the full use of the bicycle in response to a determination that the pressure signal is greater than or equal to the first pressure threshold and less than or equal to the third pressure threshold; and
    turn on the electric motor of the bicycle according to the access permission level of the full use of the bicycle.

9. The system of claim 3, wherein the at least one processor is configured to cause the system to:
obtain a speed signal of the bicycle;
determine whether the speed signal is greater than a first speed threshold; and
in response to a determination that the speed signal is greater than the first speed threshold, conducting the steps of claim 3, wherein at least one part of the bicycle is the seat of the bicycle, and to control at least one electric control component of the bicycle, the at least one processor is configured to cause the system to:
determine whether a pressure signal is greater than or equal to a first pressure threshold and less than or equal to a third pressure threshold, wherein the third pressure threshold is greater than the first pressure threshold;
determine the access permission level to be the full use of the bicycle in response to a determination that the pressure signal is greater than or equal to the first pressure threshold and less than or equal to the third pressure threshold; and
maintain operation of the electric motor of the bicycle according to the access permission level of the full use of the bicycle.

10. The system of claim 3, wherein the at least one processor is configured to cause the system to:
obtain a speed signal of the bicycle;
determine whether the speed signal is greater than a first speed threshold; and
in response to a determination that the speed signal is greater than the first speed threshold, conducting the steps of claim 3, wherein at least one part of the bicycle is the seat of the bicycle, and to control at least one electric control component of the bicycle, the at least one processor is configured to cause the system to:
determine whether a pressure signal is greater than or equal to a first pressure threshold and less than or equal to a third pressure threshold, wherein the third pressure threshold is greater than the first pressure threshold;
determine the access permission level to be the no use of the bicycle in response to a determination that the pressure signal is less than the first pressure threshold or greater than the third pressure threshold; and
turn off the electric motor of the bicycle according to the access permission level of the no use of the bicycle.

11. The system of claim 3, wherein the at least one processor is configured to cause the system to:
obtain a speed signal of the bicycle;
determine whether the speed signal is greater than a first speed threshold; and
in response to a determination that the speed signal is greater than the first speed threshold, conducting the steps of claim 3, wherein at least one part of the bicycle is the seat of the bicycle, and to control at least one electric control component of the bicycle, the at least one processor is configured to cause the system to:
determine whether a pressure signal is less than a first pressure threshold or greater than a third pressure threshold, wherein the third pressure threshold is greater than the first pressure threshold;
determine the access permission level to be the limited use of the bicycle in response to a determination that the pressure signal is less than the first pressure threshold or greater than the third pressure threshold; and
control the electric motor of the bicycle according to the access permission level of the limited use of the bicycle and limit a speed of the bicycle to be less than a second speed threshold, wherein the second speed threshold is less than the first speed threshold.

12. The system of claim 3, wherein the at least one processor is configured to cause the system to:
obtain a speed signal of the bicycle;
determine whether the speed signal is greater than a first speed threshold; and
in response to a determination that the speed signal is greater than the first speed threshold, conducting the steps of claim 3, wherein at least one part of the bicycle is the seat of the bicycle, and to control at least one electric control component of the bicycle, the at least one processor is configured to cause the system to:
determine whether a pressure signal is less than a first pressure threshold or greater than a third pressure threshold, wherein the third pressure threshold is greater than the first pressure threshold;
determine the access permission level to be limited use of the bicycle in response to a determination that the pressure signal is less than the first pressure threshold or greater than the third pressure threshold; and
control the braking device of the bicycle according to the access permission level of limited use of the bicycle and limit a speed of the bicycle to be less than a second speed threshold, wherein the second speed threshold is less than the first speed threshold.

13. The system of claim 8, wherein at least one part of the bicycle is the seat of the bicycle, and to determine an access permission level based at least on the pressure signal and control at least one electric control component of the bicycle, the at least one processor is configured to cause the system to:
determine whether the pressure signal is less than a second pressure threshold;
determine the access permission level to be the terminated use of the bicycle in response to a determination that the pressure signal is less than the second pressure threshold; and
turn off the electric motor of the bicycle and lock the lock of the bicycle according to the access permission level of the terminated use of the bicycle.

14. The system of claim 13, wherein after turning off the electric motor of the bicycle and locking the lock of the bicycle, the at least one processor is configured to cause the system to:
obtain location information of the bicycle; and
determine whether the bicycle is returned successfully based on the location.

15. The system of claim 14, wherein to determine whether the bicycle is returned successfully based on the location, the at least one processor is configured to cause the system to:
determine whether the bicycle is at a first location based on the obtained location information; and
determine that, in response to a determination that the obtained location is at the first location, the electric bicycle is returned successfully, or otherwise, that the bicycle is not returned.

16. The system of claim 15, wherein the at least one processor is further configured to cause the system to:
receive a signal indicating that the bicycle is returned successfully.

17. The system of claim 3, wherein the at least one processor is configured to cause the system to:
obtain a speed signal of the bicycle;
determine whether the speed signal is greater than a first speed threshold; and in response to a determination that the speed signal is greater than the first speed threshold, conducting the steps of claim 3, wherein at least one part of the bicycle is the basket of the bicycle, and to control at least one electric control component of the bicycle, the at least one processor is configured to cause the system to:

determine whether the pressure signal is greater than a fourth pressure threshold, determine the access permission level to be limited use of the bicycle in response to a determination that the pressure signal is greater than the fourth pressure threshold; and control the braking device of the bicycle according to the access permission level of limited use of the bicycle and limit a speed of the bicycle to be less than a second speed threshold, wherein the second speed threshold is less than the first speed threshold.

18. A non-transitory computer readable medium, comprising at least one set of instructions for controlling a bicycle used in an online to offline (O2O) service platform that provides a sharing service of bicycles, wherein when executed by at least one processor of a computing device, the at least one set of instructions causes the computing device to perform a method, the method comprising:

detecting a pressure signal from at least one part of the bicycle;

determining an access permission level based at least on the pressure signal;

controlling at least one electric control component of the bicycle according to at least an access permission level, wherein before the detecting the pressure signal from at least one part of the object, the method further comprises:

obtaining user information of a service requester;

determining whether the user information is legitimate; and unlocking the bicycle in response to that the user information is legitimate.

\* \* \* \* \*